(12) United States Patent
Kumar

(10) Patent No.: US 9,218,604 B2
(45) Date of Patent: *Dec. 22, 2015

(54) METHOD FOR EXPERT ADVISORS TO PROVIDE ONE ON ONE PHONE CALL OR CHAT ADVICE SERVICES THROUGH UNIQUE EMPOWERED INDEPENDENT AGENTS TO CONSUMERS USING MOBILE DEVICES

(71) Applicant: Gopesh Kumar, Pleasanton, CA (US)

(72) Inventor: Gopesh Kumar, Pleasanton, CA (US)

( * ) Notice: Subject to any disclaimer, the term of this patent is extended or adjusted under 35 U.S.C. 154(b) by 222 days.

This patent is subject to a terminal disclaimer.

(21) Appl. No.: 14/165,944

(22) Filed: Jan. 28, 2014

(65) Prior Publication Data

US 2014/0143141 A1    May 22, 2014

Related U.S. Application Data

(63) Continuation of application No. 12/436,857, filed on May 7, 2009.

(51) Int. Cl.
| | |
|---|---|
| *G06F 15/16* | (2006.01) |
| *G06Q 30/00* | (2012.01) |
| *G06Q 10/10* | (2012.01) |
| *G06Q 30/06* | (2012.01) |
| *H04L 12/18* | (2006.01) |
| *H04L 12/58* | (2006.01) |
| *H04L 29/06* | (2006.01) |
| *G06Q 20/22* | (2012.01) |

(52) U.S. Cl.
CPC .............. *G06Q 30/016* (2013.01); *G06Q 10/10* (2013.01); *G06Q 20/22* (2013.01); *G06Q 30/06* (2013.01); *H04L 12/1818* (2013.01); *H04L 12/581* (2013.01); *H04L 51/04* (2013.01); *H04L 65/4038* (2013.01)

(58) Field of Classification Search
CPC combination set(s) only.
See application file for complete search history.

(56) References Cited

U.S. PATENT DOCUMENTS

| | | | |
|---|---|---|---|
| 6,999,943 B1* | 2/2006 | Johnson | G06Q 20/10 705/35 |
| 7,343,008 B1* | 3/2008 | Frankel | H04M 3/56 370/260 |
| 7,856,473 B2* | 12/2010 | Horikiri | H04L 29/06027 709/204 |
| 2002/0095379 A1* | 7/2002 | Likourezos | G06Q 20/04 705/40 |
| 2004/0034723 A1* | 2/2004 | Giroti | H04L 12/1822 710/8 |
| 2004/0128354 A1* | 7/2004 | Horikiri | H04L 29/06027 709/204 |
| 2008/0186879 A1* | 8/2008 | Bowman | H04L 12/66 370/260 |
| 2008/0201219 A1* | 8/2008 | Broder | G06Q 30/0257 705/14.55 |
| 2008/0259824 A1* | 10/2008 | Frankel | H04M 3/56 370/260 |
| 2009/0024623 A1* | 1/2009 | Broder | G06Q 30/02 |
| 2009/0063353 A1* | 3/2009 | Viidu | G06Q 20/04 705/75 |
| 2009/0228808 A1* | 9/2009 | MacDonald | G06Q 10/10 715/756 |
| 2009/0281872 A1* | 11/2009 | Kalaboukis | G06Q 30/0256 705/14.54 |
| 2010/0161430 A1* | 6/2010 | Mandel | G06Q 30/02 705/14.73 |

* cited by examiner

*Primary Examiner* — Saket K Daftuar
(74) *Attorney, Agent, or Firm* — White-Welker & Welker, LLC; Matthew T. Welker, Esq.

(57) ABSTRACT

The present invention provides techniques for managing, supporting and empowering Independent Agents to offer a method for enabling expert Advisors to deliver, and charge for, advice to consumers, by connecting two parties in real time in an online chat using mobile devices. The present invention also provides the method and techniques for expert Advisors, in turn, to provide their service through a multiplicity of Independent Agent channels without the potential for communication device conflict; thereby ensuring successful connections for consumers.

29 Claims, 34 Drawing Sheets

101

102

104

105

106

107

108  Search by Advisor Dial-In Id :

109  Search by Advisor Name :

105

114

115

116

125

127

124

149

METHOD FOR EXPERT ADVISORS TO PROVIDE ONE ON ONE PHONE CALL OR CHAT ADVICE SERVICES THROUGH UNIQUE EMPOWERED INDEPENDENT AGENTS TO CONSUMERS USING MOBILE DEVICES

CROSS REFERENCE TO RELATED APPLICATIONS

This application claims priority from and is a continuation in part of U.S. patent application Ser. No. 12/436,857 entitled "Method for Providing a Conference System Allowing Advisors to Offer Conference Sessions to Clients", filed on 7 May 2009. The benefit under 35 USC §119 of the United States application is hereby claimed, and the aforementioned application is hereby incorporated herein by reference.

This is related to U.S. patent application Ser. No. 11/164,718, entitled "System and Method for Automatically Assigning an Extension Number to a Telephone Number to Enable Precise, Efficient, and Scalable Tracking of the Origin of a Telephone Call/chat from a Prospect to an Advertiser within a Performance Advertising Multi-Advertisement, Multi-Publisher Famework", filed on 3 Aug. 2004, now U.S. Pat. No. 7,555,106 issued 30 Jun. 2009.

This is related to U.S. patent application Ser. No. 10/710,795, entitled "A System and Method for connecting consumers with a diverse set of consultants and experts", filed on 3 Aug. 2004, now U.S. Pat. No. 8,015,292 issued 6 Sep. 2011.

This application is related to U.S. patent application Ser. No. 10/711,549, entitled "A System and Method for Expert Advisors to provide advice services through unique empowered Independent Agents to Consumers", filed on 24 Sep. 2004, now U.S. Pat. No. 8,046,472.

This application is related to U.S. patent application Ser. No. 12/697,279, entitled "A system and method for expert Advisors to provide one on one chat advice services through unique empowered independent agents to consumers", filed on 31 Jan. 2010, now U.S. Pat. No. 8,219,689 issued 10 Jul. 2012.

SEQUENCE LISTING OR PROGRAM

Not Applicable

FEDERALLY SPONSORED RESEARCH

Not Applicable

TECHNICAL FIELD OF THE INVENTION

The present invention relates to techniques for managing, supporting and empowering Independent Agents to offer a method for enabling expert Advisors to deliver, and charge for, advice to consumers, by connecting two parties in real time in an one on one phone call or chat using mobile devices.

BACKGROUND OF THE INVENTION

The World Wide Web is currently a subject of intense and rapidly growing interest. The World Wide Web is composed of interconnected data sources that are accessible to computer Users through data-communication networks such as the Internet. The data available on the World Wide Web has been assembled by private individuals, commercial companies, government agencies, and special interest organizations. Much of this assembled information is organized into Pages.

A Web site is a collection of Pages (and possibly other data which, together with Pages, are generically referred to as Web components) offered by a sponsoring entity, herein referred to as the site owner.

Large Web sites are typically organized hierarchically. For example, corporate Web sites often consist of smaller Web sites, each providing information about a business unit of the parent company.

The Web site itself resides on one or more server hosts. Web components stored on the server host are offered to Users of the World Wide Web through a software program known as a Web server. A network User uploads or downloads data from a Web site through a browser, a software program running on the client host. The browser establishes contact with the Web server and issues a request for data stored on the server host. This results in data from the server host being downloaded into the browser. This data is typically or a HyperText document specifying information required by the browser to display the Web page (i.e., formatting information specifying the structure of the page, or URLs of images that are to be placed on the page), embedded client software programs which run inside the browser (e.g., Java script code), and other content to be downloaded to the client computer or displayable through client software programs that add to the browser's functionality (sometimes referred to as "browser plug-ins").

Currently, Pages are typically defined using HyperText Markup Language ("HTML"). HTML provides a standard set of tags that define how a Web page is to be displayed. When a User indicates to the browser to display a Web page, the browser sends a request to the server computer system to transfer to the client computer system an HTML document that defines the Web page. When the requested HTML document is received by the client computer system, the browser displays the Web page as defined by the HTML document. The HTML document contains various tags that control the displaying of text, graphics, controls, and other features. The HTML document may contain URLs of other Pages available on that server computer system or other server computer systems.

As more and more demand, and the use of technology enter peoples' lives, there exists a great need for people to be able to contact experts and Advisors easily and quickly on any topic or subject via the Internet or using mobile devices. While many companies have pages and/or telephone support lines, most do not offer the most convenient and integrated way for potential clients to reach them, nor a simple, automated, yet comprehensive method for charging for their services using mobile devices.

There is a need for a system, especially an Internet-based system, that will enable customers to easily and quickly connect to Advisors from Internet-based icons located in a broad collection of vehicles such as individual websites, website directories, emails, or online advertisement banners, so that these Advisors can reach and assist these customers with their questions, in return for fair and agreed-upon payment using mobile devices.

Advice services are currently offered through a variety of methods and techniques utilizing the telephone and/or the Internet. A consumer seeking advice on any number of various topics can search in a telephone book's yellow pages, for example, and make a basic telephone call or chat. But advice Advisors are not able to effectively or efficiently charge time-based fees for their service in this model, nor are consumers guaranteed that the Advisor will be available. Further, Internet searching using mobile devices is steadily replacing traditional yellow pages searches by consumers.

1-900 phone systems do enable Advisors to charge for their services on a time-elapsed model. However, 1-900 systems also are not able to take advantage of the massive trend of consumers increasingly using the Internet and mobile devices to search for what they want and need, including advice on various topics. Further, single 1-900 numbers have restricted scope and flexibility with regard to service and price, as well as limited consumer trust with regards to billing and quality of service provided.

Currently, there are systems available that facilitate the delivery of advice to consumers in real-time via the Internet utilizing telecommunications systems. However, such systems have created such a massive directory with thousands upon thousands of individual listings in any given category that it has become overwhelming for consumers to determine their choice. Likewise, it has become near impossible for the large majority of individual Advisors to attract any interested consumers, as the rigid nature of the directory listing system allows extremely limited opportunities for a particular Advisor to differentiate their service among the thousands of others in the same list.

Consequently, there is a need for a system to enable the provision of advice service through both the Internet and telecommunications using mobile devices that can overcome all of the limitations described above. Such a system, which empowers and utilizes independent Agents within its inventive framework and creative methods, is hereinafter described.

DEFINITIONS

Agent: one who integrates and employs the System within their websites or other Internet-based displayed and/or published materials offering a unique, differentiated grouping of Advisors who collectively employ the System.

Browser: a software program that runs on a client host and is used to request Pages and other data from server hosts. This data can be downloaded to the client's disk or displayed on the screen by the browser.

Chat: real-time, synchronous, text-based communication via computer or mobile device.

Client host: a computer that requests Pages from server hosts, and generally communicates through a browser program.

Content provider: a person responsible for providing the information that makes up a collection of Pages.

Electronic notification: any automated communication received by e-mail, phone, fax, text message, SMS, RSS or any third party software notification or alerting system.

Embedded client software programs: software programs that comprise part of a Web site and that get downloaded into, and executed by, the browser.

Host: a computer that is connected to a network such as the Internet. Every host has a hostname (e.g., mypc.mycompany.com) and a numeric IP address (e.g., 123.104.35.12).

HTML (HyperText Markup Language): the language used to author Pages. In its raw form, HTML looks like normal text, interspersed with formatting commands. A browser's primary function is to read and render HTML.

HTTP (HyperText Transfer Protocol): protocol used between a browser and a Web server to exchange Pages and other data over the Internet.

HyperText: text annotated with links to other Pages (e.g., HTML).

Internet-Based Icon: a graphical or text icon that is linked to this system's database and enables the initiation of contact between the Advisor and the consumer, which is located anywhere throughout the Internet including but not limited to websites, emails, directory listings, and advertisement banners IP (Internet Protocol): the communication protocol governing the Internet.

Server host: a computer on the Internet that hands out Pages through a Web server program.

Advisor: one who is providing advice through this system to Users or consumers. Also known as an Expert or an Advisor.

URL (Uniform Resource Locator): the address of a Web component or other data. The URL identifies the protocol used to communicate with the server host, the IP address of the server host, and the location of the requested data on the server host.

User: one who is seeking advice services from expert Advisors through this system. Also known as a Consumer or Customer.

UWU server: in connection with the present invention, a special Web server in charge of distributing statistics describing Web traffic.

Visit: a series of requests to a fixed Web server by a single person (through a browser), occurring contiguously in time.

Web master: the person in charge of keeping a host server and Web server program running.

Web page: multimedia information on a Web site. A Web page is an HTML document comprising other Web components, such as images.

Web server: a software program running on a server host, for handing out Pages.

Web site: a collection of Pages residing on one or multiple server hosts and accessible through the same hostname (such as, for example, www.lucent.com).

SUMMARY OF THE INVENTION

The current invention utilizes the Internet and mobile devices. The Internet comprises a vast number of computers and computer networks that are interconnected through communication links. The interconnected computers exchange information using various services, such as electronic mail, Gopher, and the World Wide Web ("WWW"). The WWW service allows a server computer system (i.e., Web server or Web site) to send graphical Pages of information to a remote client computer system. The remote client computer system can then display the Pages. Each resource (e.g., computer or Web page) of the WWW is uniquely identifiable by a Uniform Resource Locator ("URL"). To view a specific Web page, a client computer system specifies the URL for that Web page in a request (e.g., a HyperText Transfer Protocol ("HTTP") request). The request is forwarded to the Web server that supports that Web page. When that Web server receives the request, it sends that Web page to the client computer system. When the client computer system receives that Web page, it typically displays the Web page using a browser. A browser is a special-purpose application program that affects the requesting of Pages and the displaying of Pages.

It is the objective of the current invention to provide a system and methods for managing, supporting and empowering independent Agents to offer a unique platform around a standard mobile devices for enabling expert Advisors to deliver, and charge for, advice to consumers, by connecting two parties in real time in an one on one phone call or chat using mobile devices. The present invention remedies the shortcomings of the prior art by enabling group Agents to integrate the system into their own specialized websites or apps running on mobile devices, thereby allowing a much greater expression of differentiation for Advisors and more focused, comprehensible listings for consumers.

The present invention provides the method and techniques to empower expert Advisors, in turn, to provide their service through an unlimited number of independent Agent channels without potential communication device conflict, thereby maintaining both Advisor and consumer satisfaction using mobile devices.

The benefits of this invention include the facilitation of real-time communication between a Consumer and Advisor for advice, the management of the accounting system for Consumer, Agent and Advisor, the empowerment of Agents to develop their own customized website that integrates and utilizes the system thereby offering Consumers more focused and differentiated choice online, and the ability for Advisors to offer their expert services via multiple accounts to numerous independent Agents by eliminating any potential for telecommunication device conflict.

The system provides a more efficient practical and functional method to enable Users to contact Advisors for expert advice and Advisors to promote and offer their services to and transact their services with consumers than the current art.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

The following description is demonstrative in nature and is not intended to limit the scope of the invention or its application of uses. There are a number of significant design features and improvements incorporated within the invention. The current invention is a system that will allow Users to contact Advisors in specific fields. The Users will choose an Advisor to contact. Once an Advisor is chosen, a window will appear telling that User, among other things, if the Advisor is available or not. If the Advisor is available, the system will connect the User with the Advisor upon a user initiated call or chat request. If the Advisor is unavailable the system will allow the User to schedule a call/chat or submit a call/chat back request.

When a User submits a callback request, the system checks for any existing callback requests with that advisor and displays the User's queue number 171 and time left for their request, and allows the User to update the time duration and phone number. In addition, when a User submits a new request, the system displays the User's queue number 171 once the request is processed successfully. The user can submit the callback request as shown in the images, or in another embodiment, there will be an option to submit Scheduled Requests where the user is requesting a specific time and time duration.

The system provides techniques for managing, supporting and empowering Independent Agents to offer a method for enabling expert Advisors to deliver, and charge for, advice to consumers, by connecting two parties in real time in a call or chat. Further, the present invention provides the method and techniques for expert Advisors, in turn, to provide their service through a multiplicity of Independent Agent channels without potential communication device conflict for consumers.

The computer application that includes the User interface for this invention will henceforth be referred to as "the System" 1. The system 1 is network based and works on an Internet, Intranet and/or Wireless network.

Figure 1:
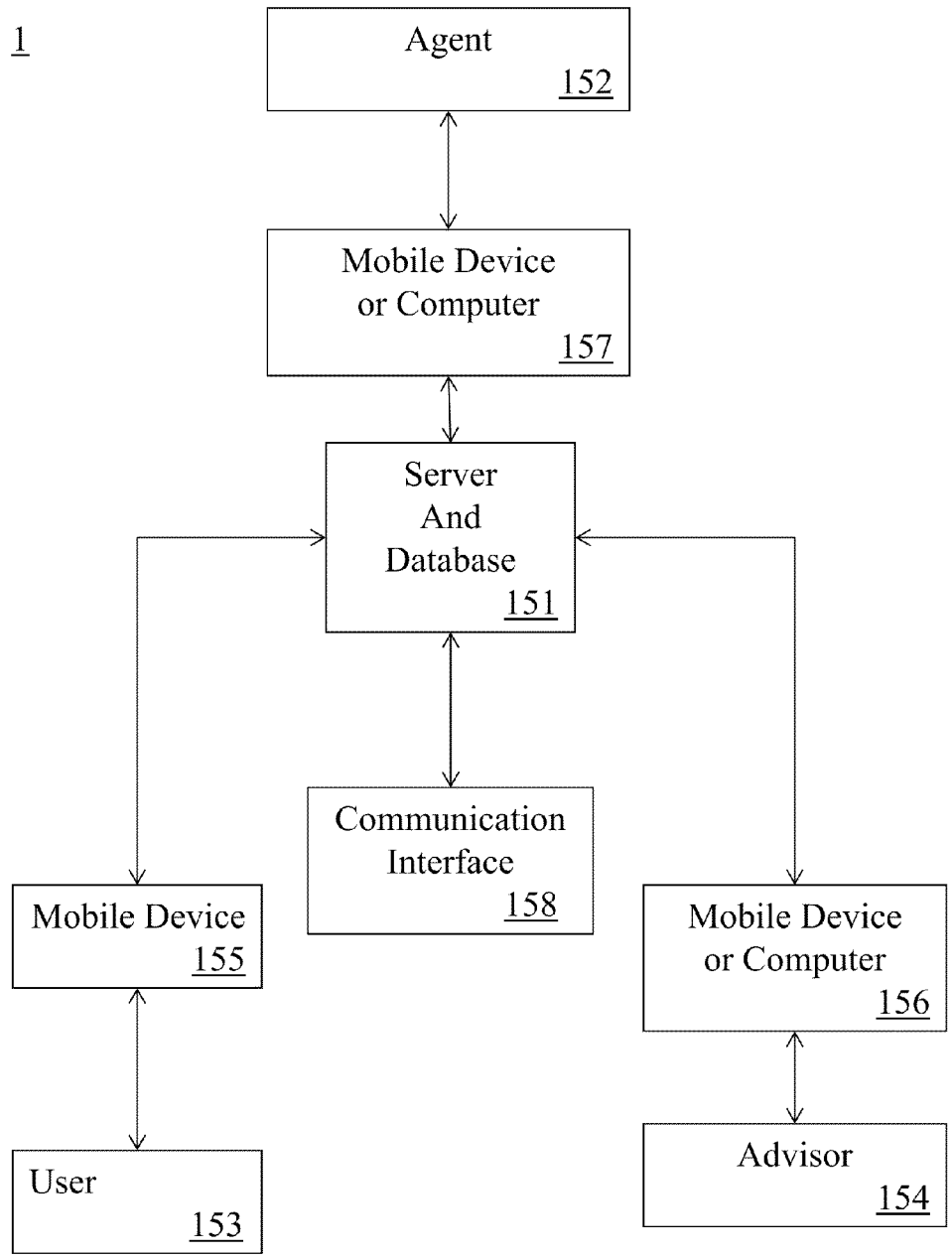
FIG. 1 shows an overview of how the system, Agents, Advisors, and Users are connected.
Figure 2:
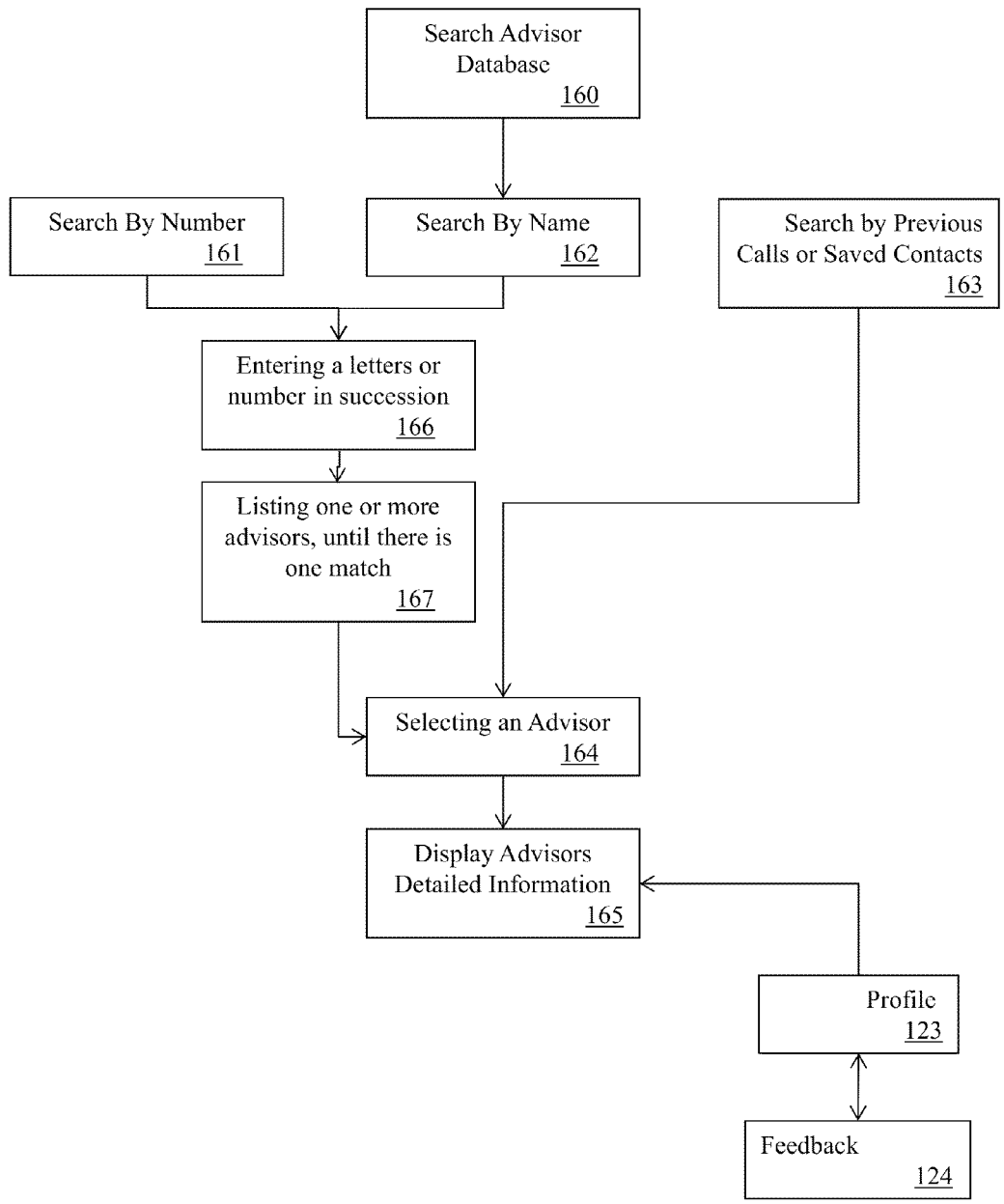
FIG. 2 illustrates the method by which a User would search the database for an Advisor.
Figure 3:
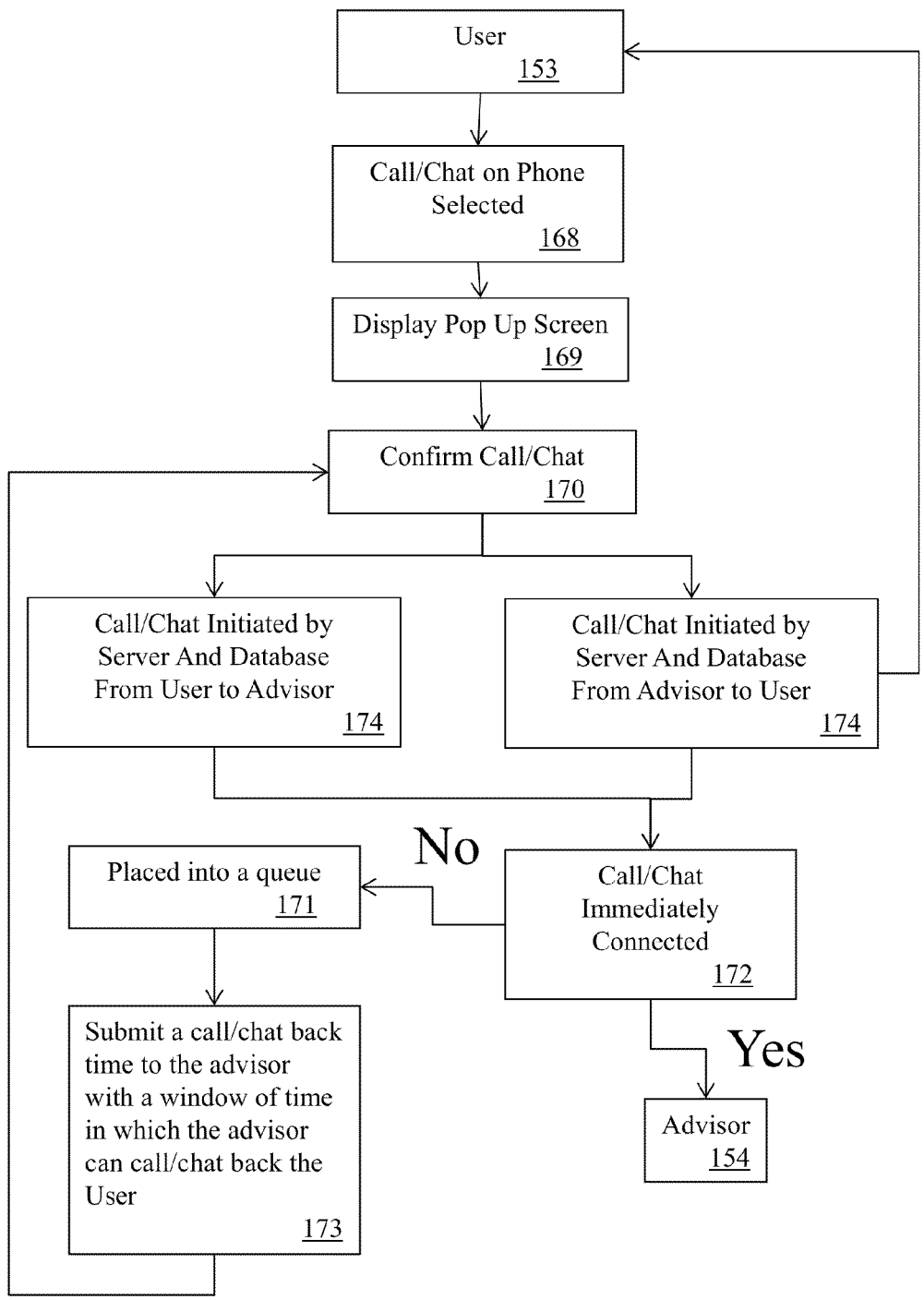
FIG. 3 illustrates the method by which a User would initiate a call to an Advisor and the process for creating a call back if an Advisor is unavailable.

FIG. 1 illustrates a functional diagram of the system of the present invention which communicates between agents 152, users 153, and advisors 154 across a plurality of computers, mobile devices 155-157 or any combination thereof providing access to a Server and a Database 151. Accessing the Server and a Database 151 is accomplished directly through a communication means such as mobile devices 155-157 through an on-line Advisor like AT&T or VERIZON or any internet connection either through an Advisor or over any wireless network. In the preferred embodiment of the System 1, an Agent of the System 1 will provide an industry-specific Internet-based directory, where a User can locate and choose from numerous Advisors.

In one preferred embodiment of the invention, the Users 153, Agents 152 and Advisors 154 can connect to the server and database 151 using their respective mobile devices 155-157 to register their accounts and log in. The system provides techniques for managing, supporting and empowering Independent Agents to offer a method for enabling expert Advisors to deliver, and charge for, advice to consumers, by connecting two parties in real time in a call or chat. Further, the present invention provides the method and techniques for expert Advisors, in turn, to provide their service through a multiplicity of Independent Agent channels without potential communication device conflict for Users.

The server and database 151 provides the ability to allow Users 153 to contact Agents 152 and Advisors 154. The server and database 151 will connect the User 153 and the Advisor 154 using via mobile devices 154-156. In the preferred embodiment, once a User 153 decides on an Advisor 154, the communication interface 158 will call or chat both the User 153 and the Advisor 154 to connect them so that the Advisor 154 can assist the User 153. The communication interface 158 will create a call or chat session between the mobile devices, computer or combination thereof.

Figure 4:
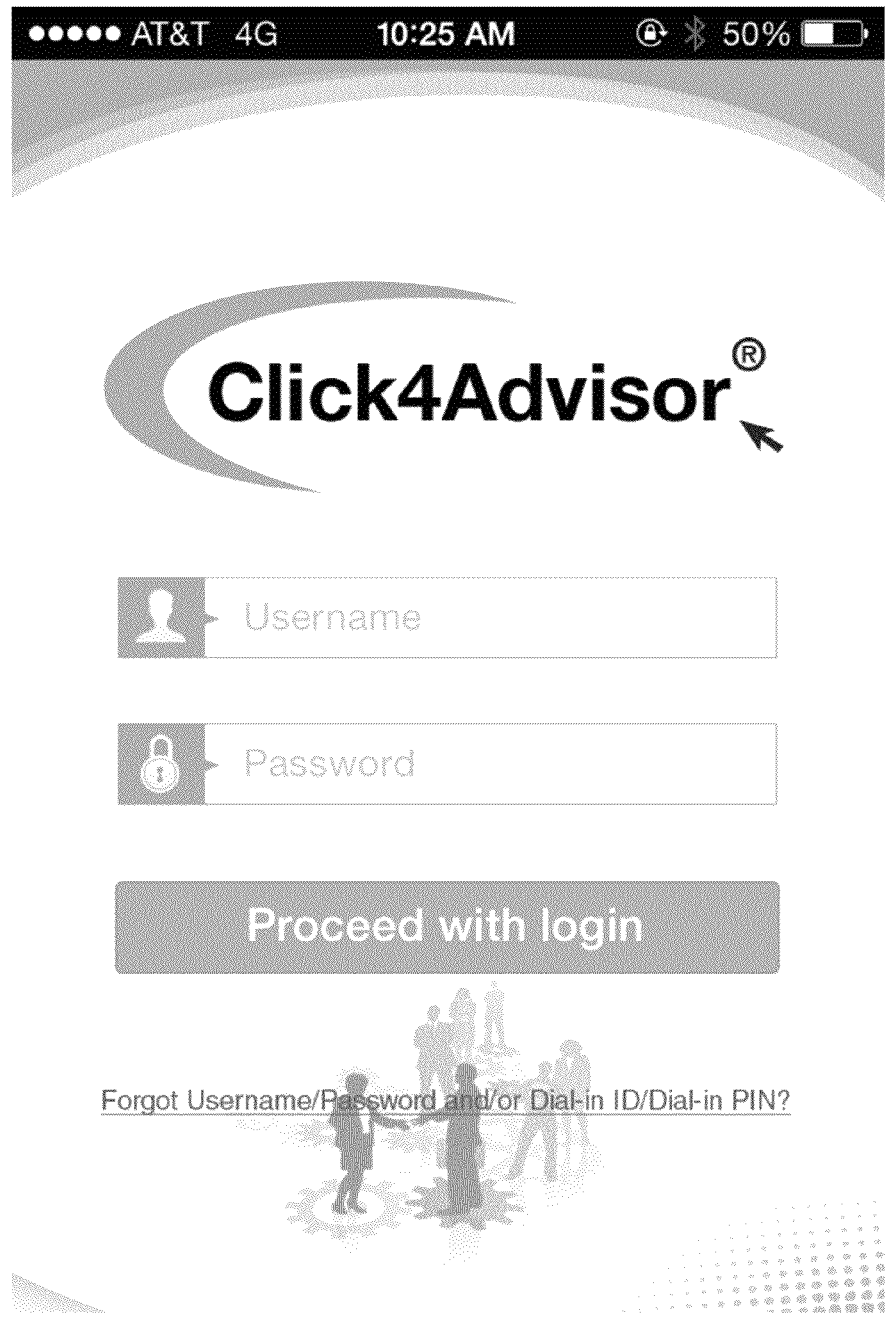
FIG. 4 shows the system's main login page.
Figure 5:
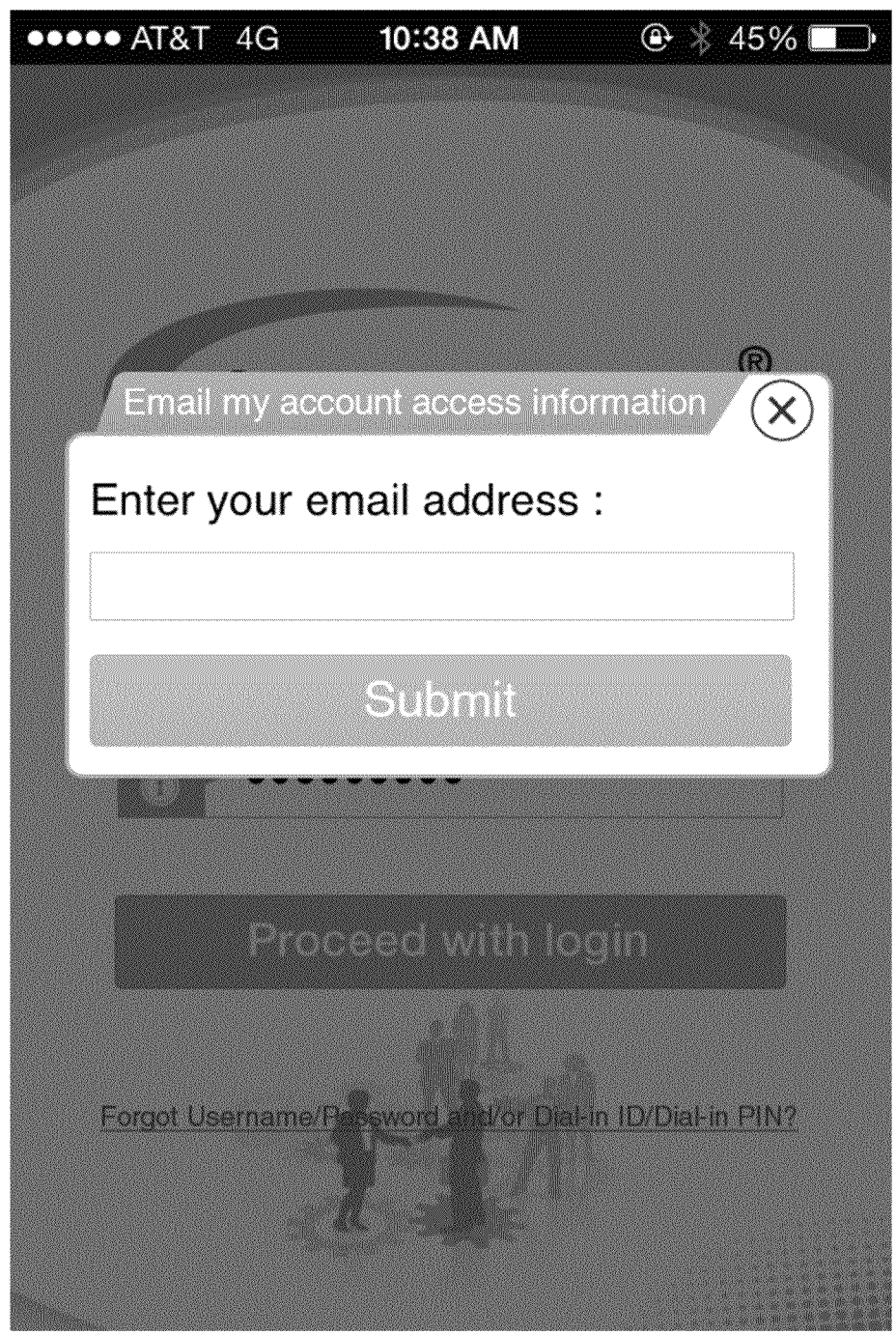
FIG. 5 shows the systems forgot password page.
Figure 6:
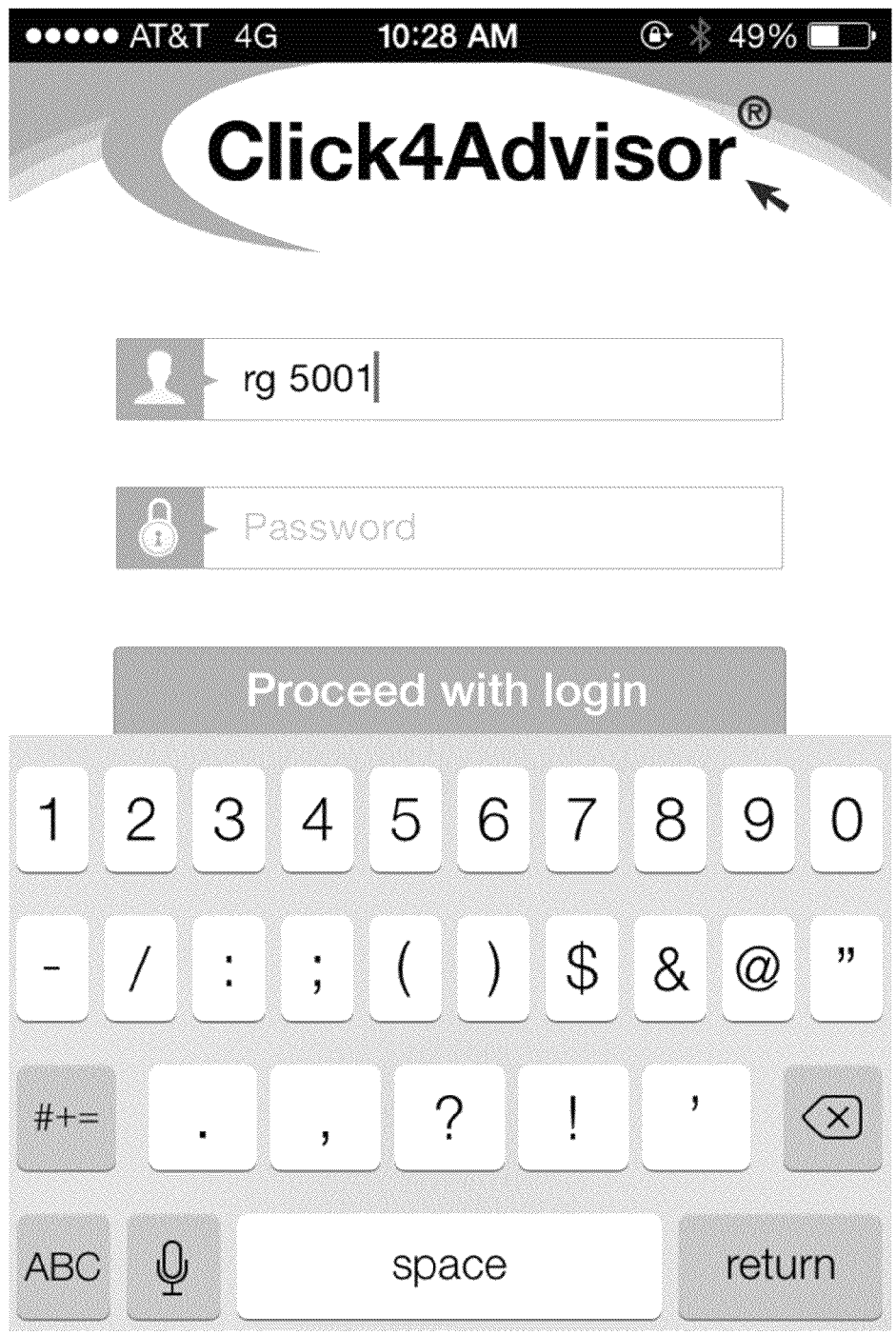
FIG. 6 shows the system's password page.
Figure 7:
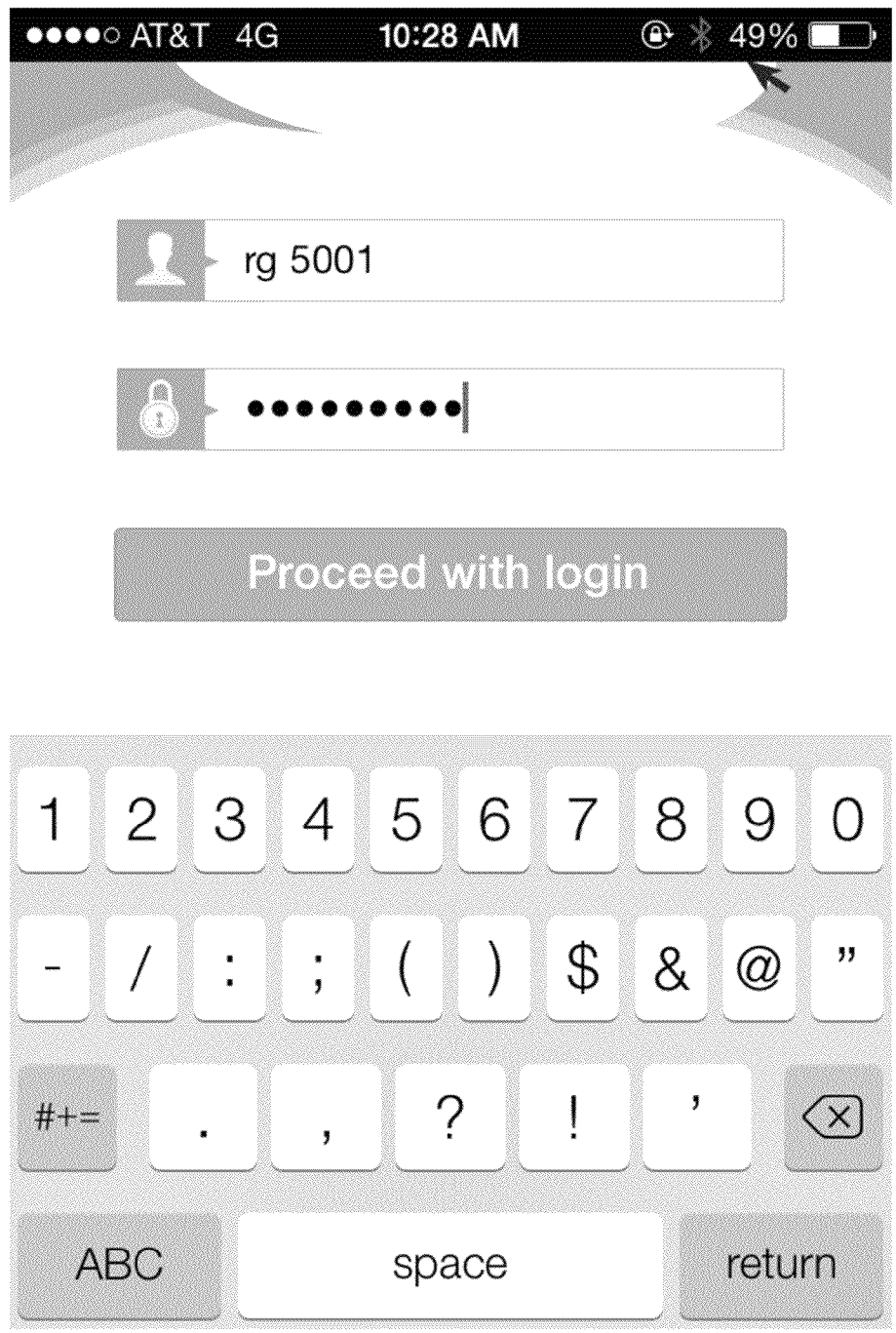
FIG. 7 shows the system's username page.

In one preferred embodiment of the invention, the Users 153 connect to the server and database 151 using mobile devices and an application running on the mobile device. The system 1 would have a standard login page 101 as shown in FIG. 4. This login page would have information about the system 1. The main web page in the preferred embodiment would also have an icon that a User 153 would click for help and information pages. A User 153 would enter their email address and submit it to access the account login information through email as shown on the simulated mobile device screen 102 of FIG. 5. A User 153 would enter their username and password to obtain access to the system and their account shown in the login screen 103 of FIG. 7. On the login page, there will be a "Create New Account" button which will allow the user to create account.

Figure 8:
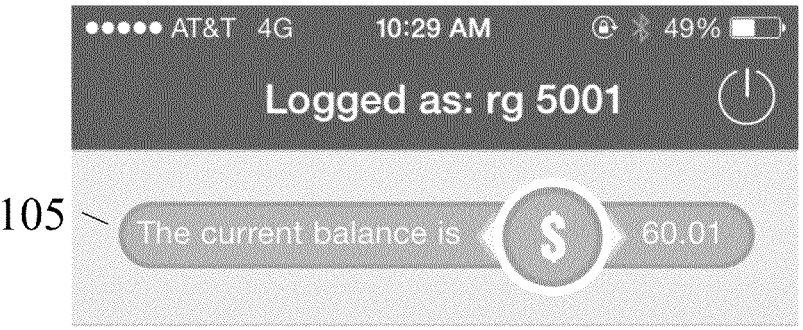
FIG. 8 shows the system's homepage.
Figure 8:
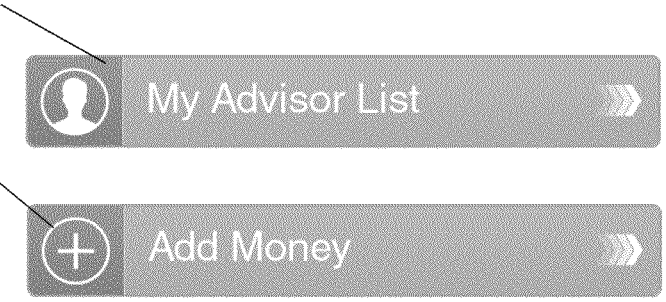
Figure 9:
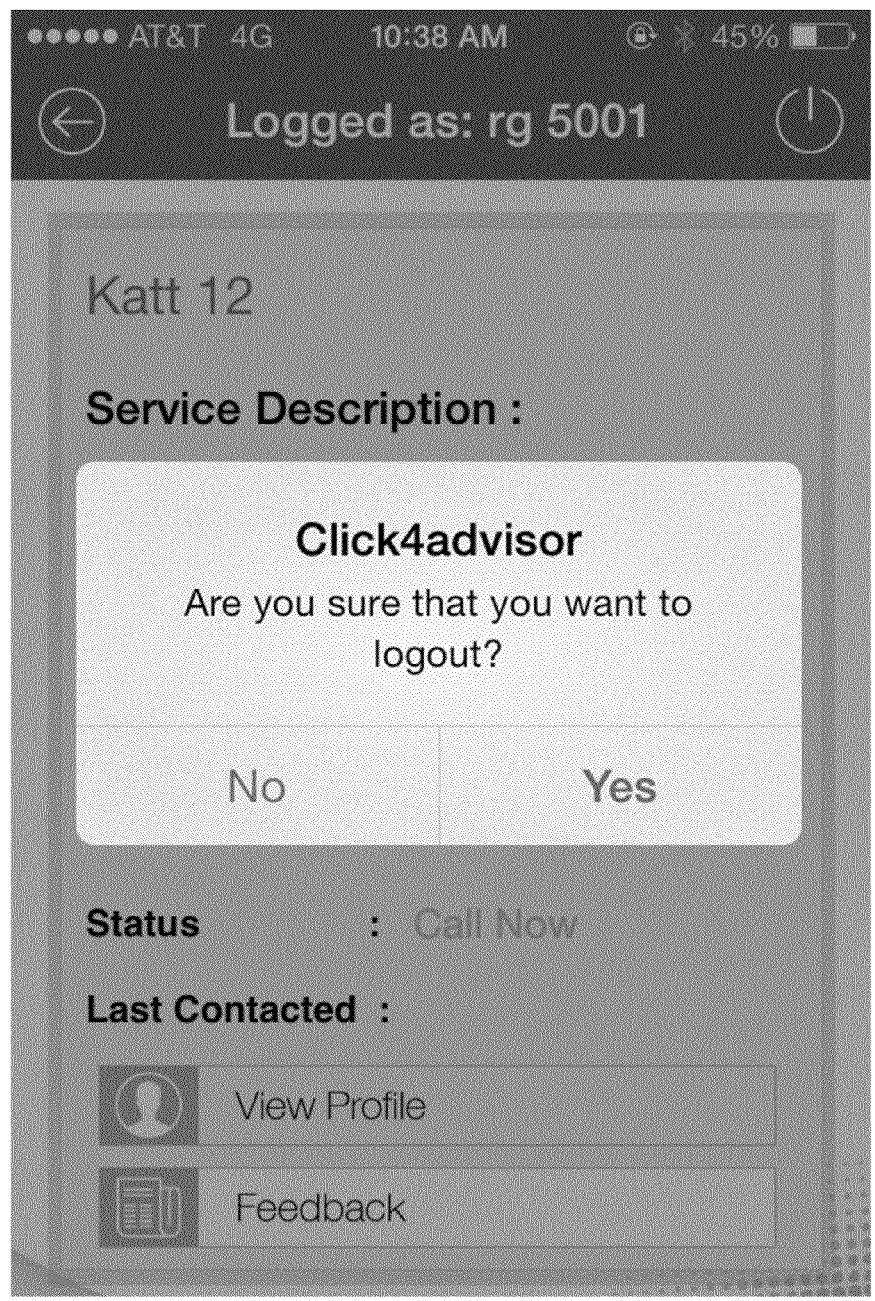
FIG. 9 shows the system's logout prompt.

Upon successful login, the User 153 would be able to view their account information from a logged-in, homepage screen 104 which shows their account balance 105, and provides options to view an advisor list 106, add money 107, or conduct advisor searches by dial-in ID 108 or name 109 as shown by FIG. 8. When a User 153 is done with the system, the User 153 can logout, as shown in FIG. 9 in the simulated logout screen 105.

Figure 10:
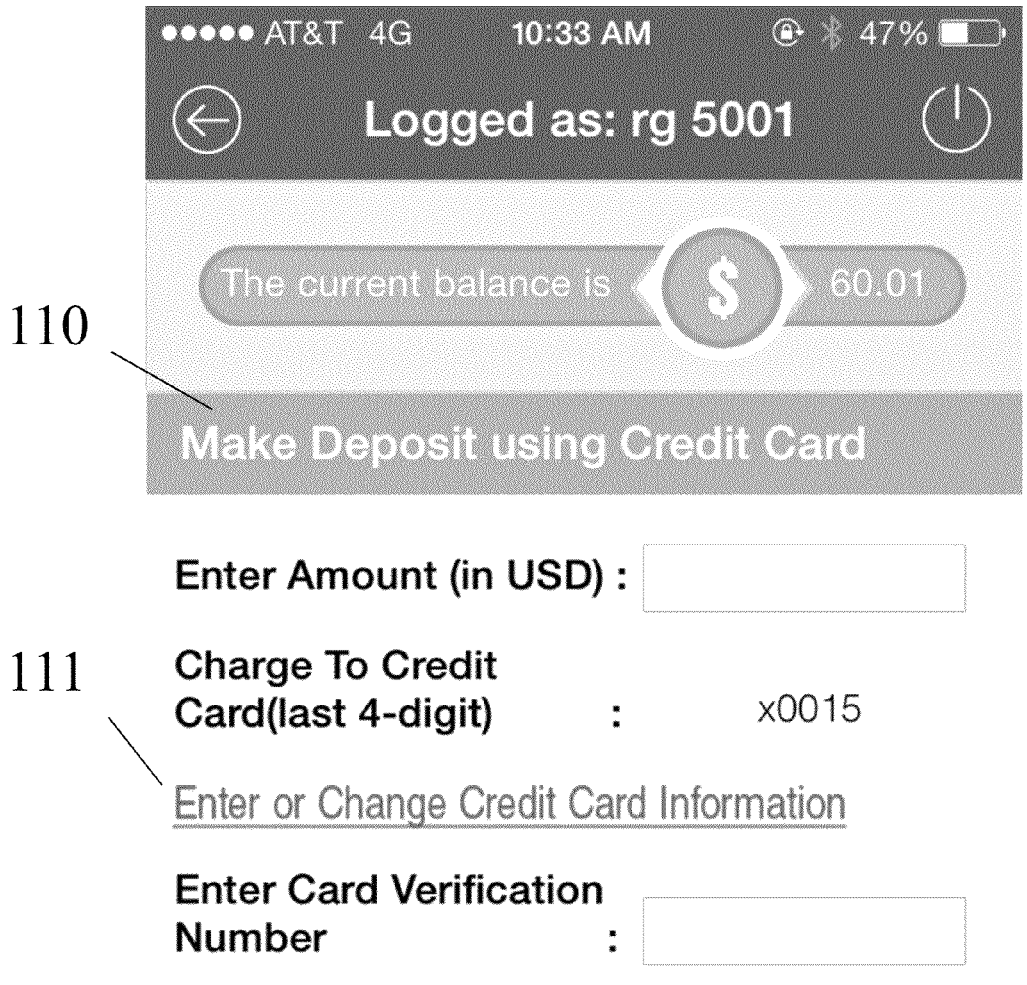
FIG. 10 illustrates the systems money page.
Figure 11:
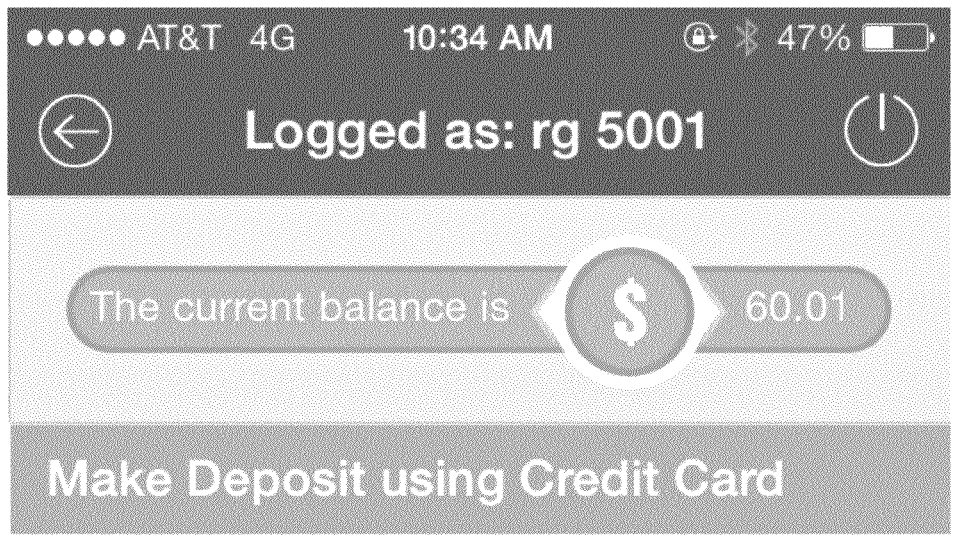
FIG. 11 illustrates the add money option.
Figure 12:
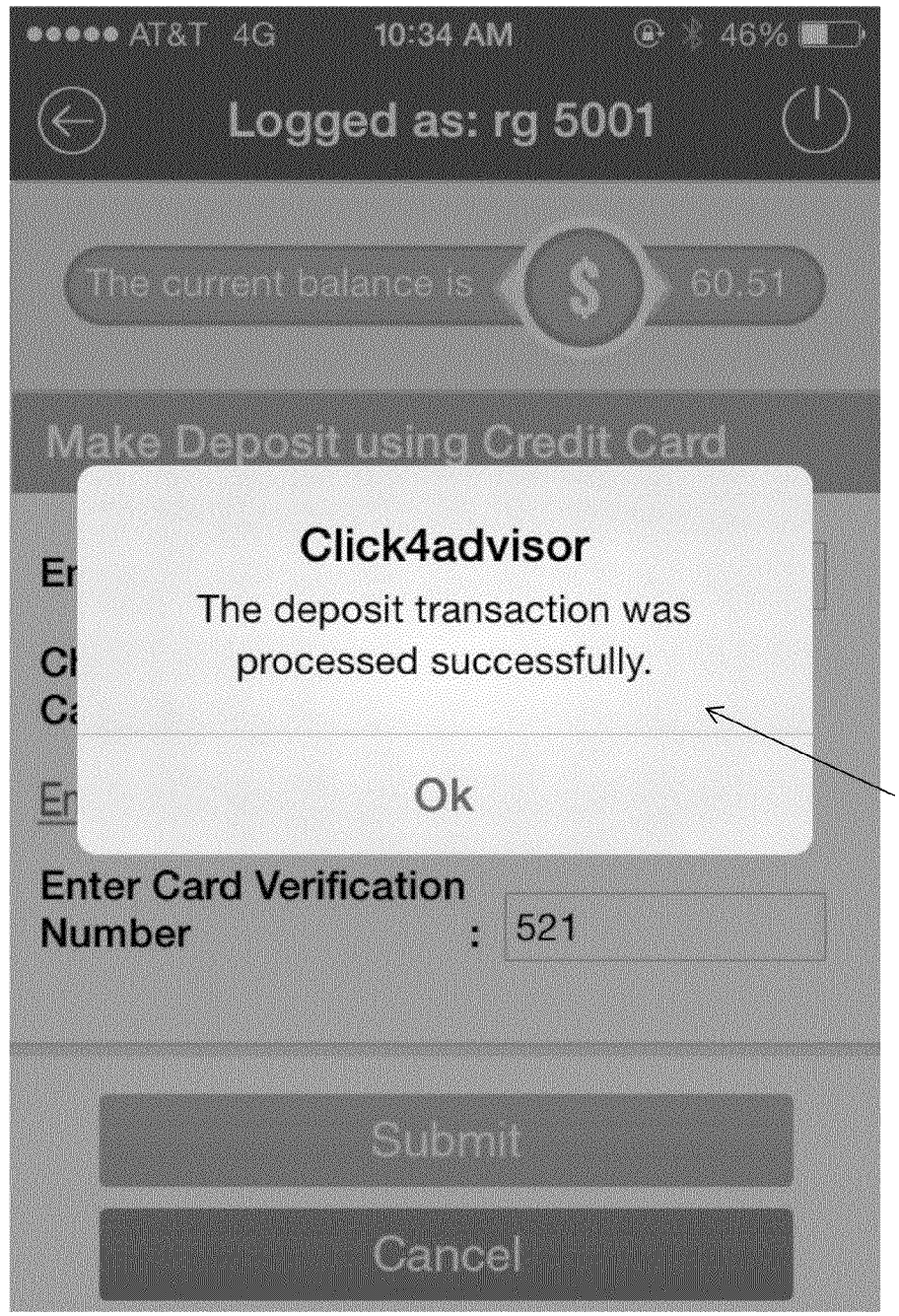
FIG. 12 illustrates adding money with data option.

Now referring to FIGS. 10-12, the user can check their current balance 110 and make deposits 111 by entering credit card information 112. The system will display a prompt 113 to confirm a successful transaction as shown in FIG. 12.

Figure 13:
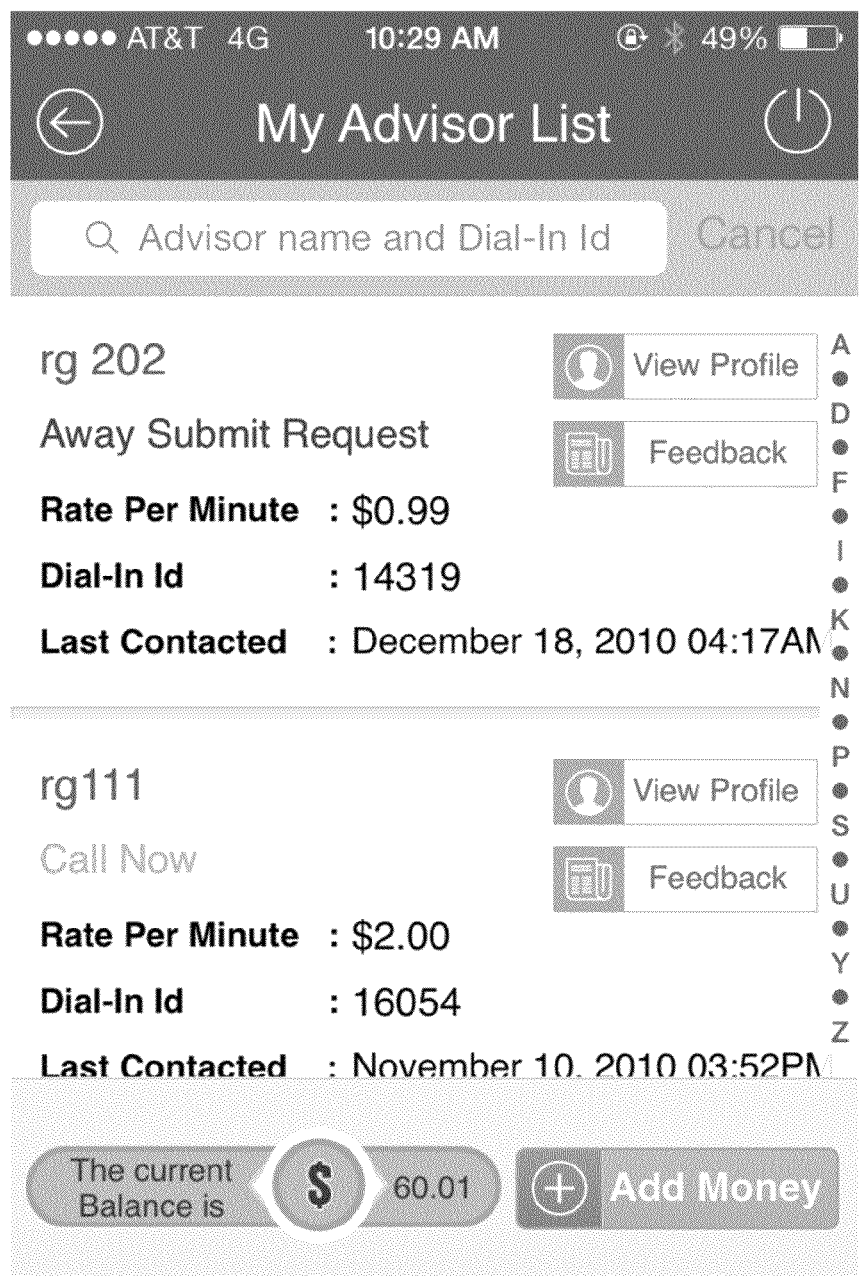
FIG. 13 illustrates an advisor list.

FIG. 13 illustrates an advisor list 114 which includes the User 153 advisors that they have used or that they have selected to include in their list for future reference. In the "My Advisor List", scrolling through the list has been made easier by allowing a quick search on a vertical key pad as shown. For example, if a User taps the letter "r", the system displays all the advisor names that start with the matching letter. In the present embodiment, the present invention teaches and illustrates a "My Advisor List", "Search by ID", and "Search by Name". In future embodiments the present invention will also present the option "Show Other Advisors" which will show all other advisors, their rates, and statuses to the user upon request.

Figure 14:
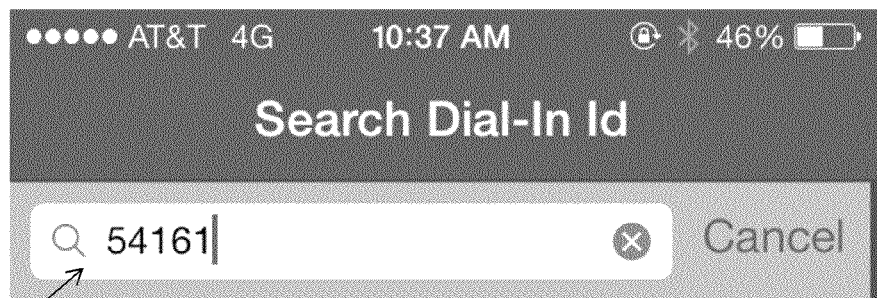
FIG. 14 illustrates and advisor search by dialing.
Figure 14:
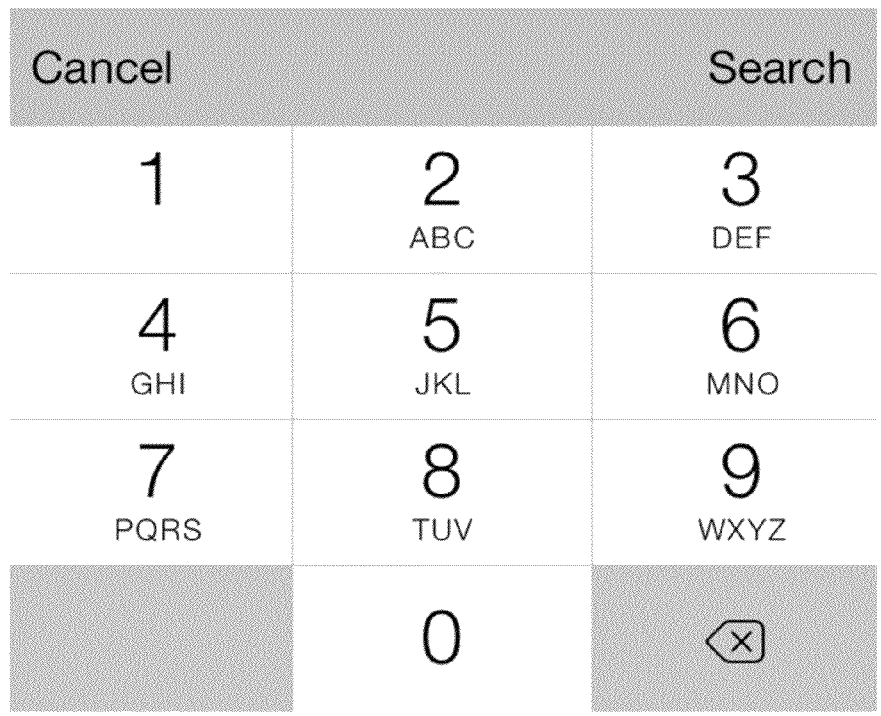
Figure 15:
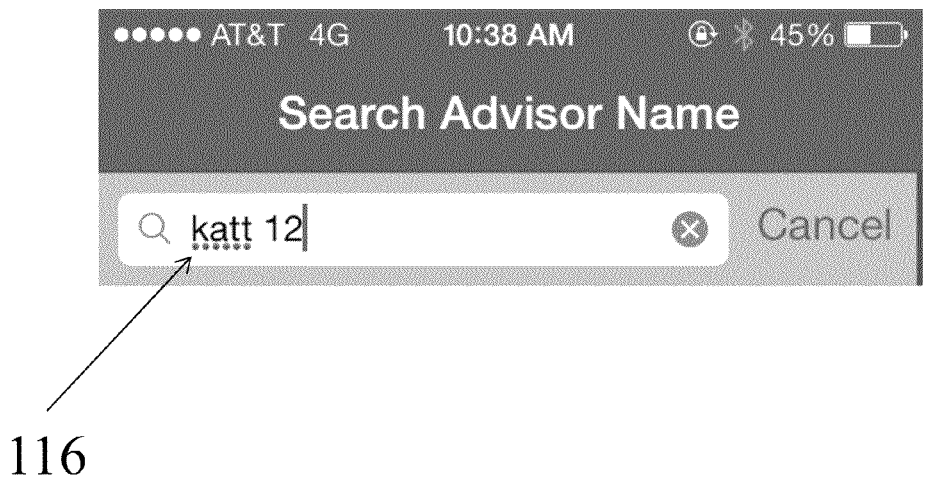
FIG. 15 illustrates an advisor search by name.
Figure 15:
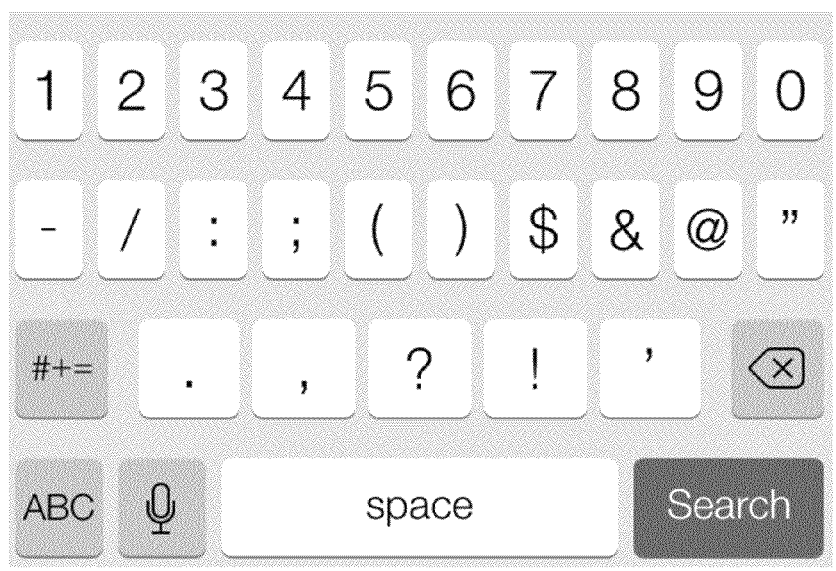
Figure 16:
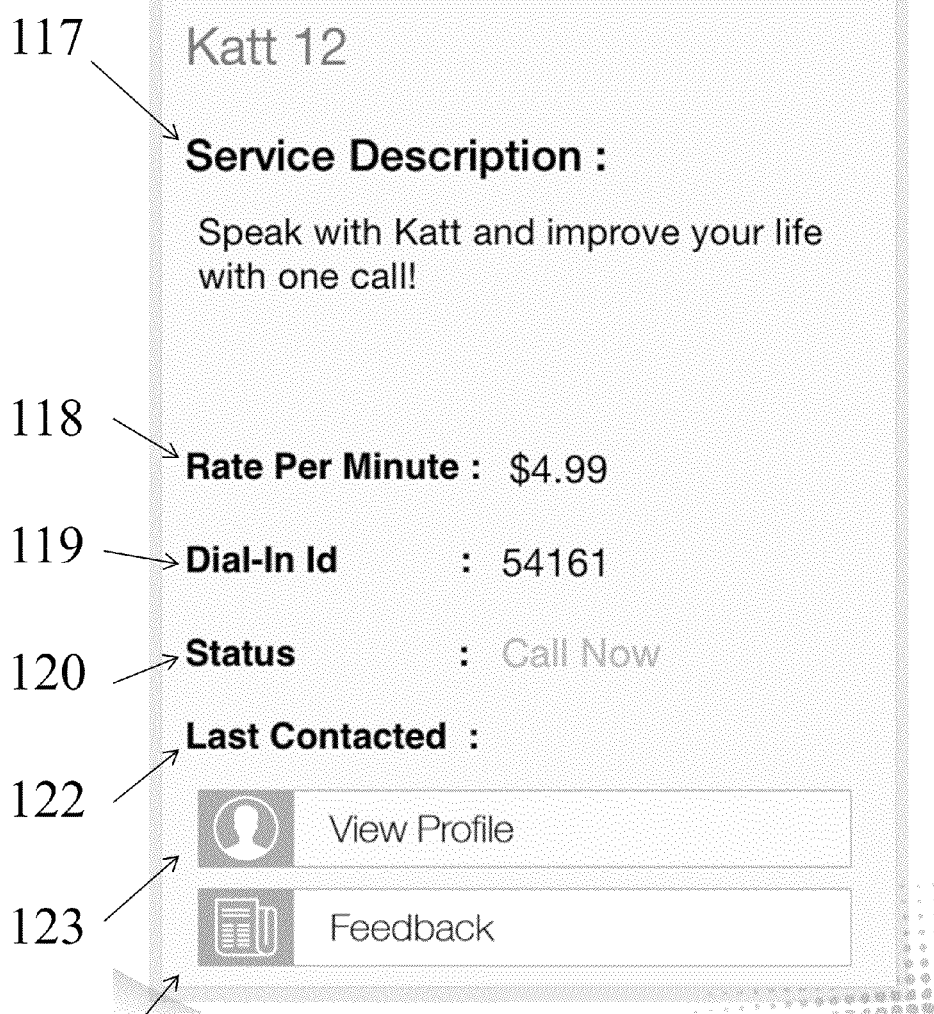
FIG. 16 illustrates advisor search results detail.

The user can search the advisor database by dial an advisor's number 115 using the phone keypad of their mobile device is shown in FIG. 14. Similarly, the user can search the advisor database by dial an advisor's name 116 using the phone keypad of their mobile device is shown in FIG. 15.

When the user searches by Dial-In ID or searches by Advisor Name, the system displays the matching advisors and their status as the user types characters. If there is no match, the system allows the user to search for a new advisor. This saves time for users when trying to find an advisor, as the advisor status and search new advisor are all in one place.

Once an advisor is successfully found by either a number 161 or name search 162, the advisors detailed information such as the service description 117, rate 118, dial-in ID 119, status 120 is shown on the display screen 121, and last contacts date/time if applicable 122. The User 153 also has the option to click on links to view the advisors profile 123 or feedback 124.

Figure 17:
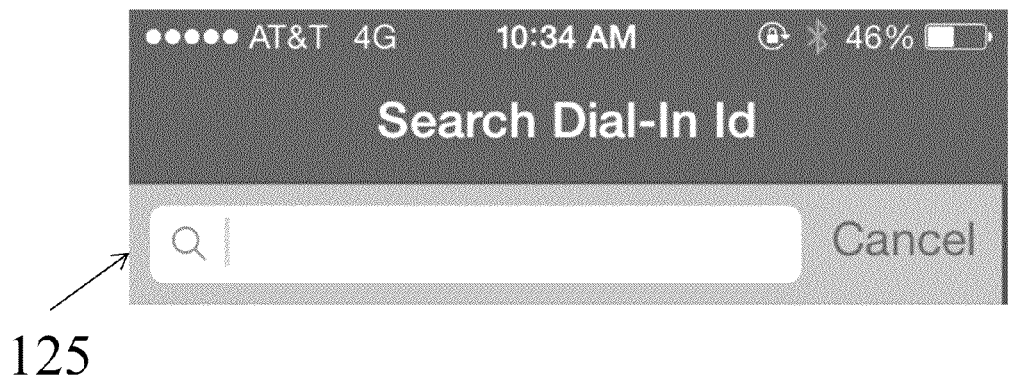
FIGS. 17-19 illustrate a search by dial-in data.
Figure 17:
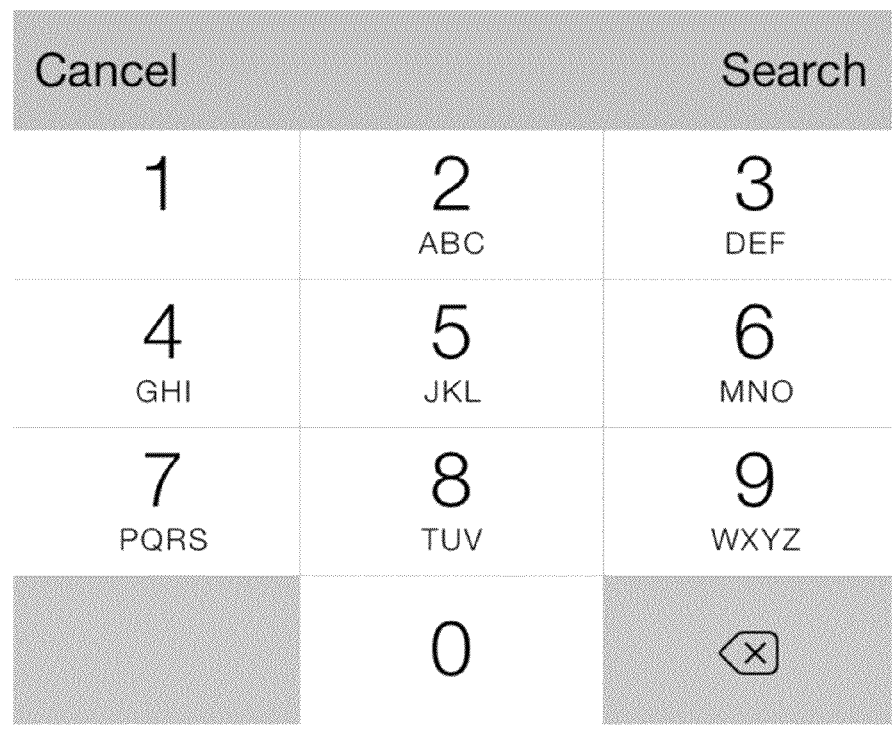
Figure 18:
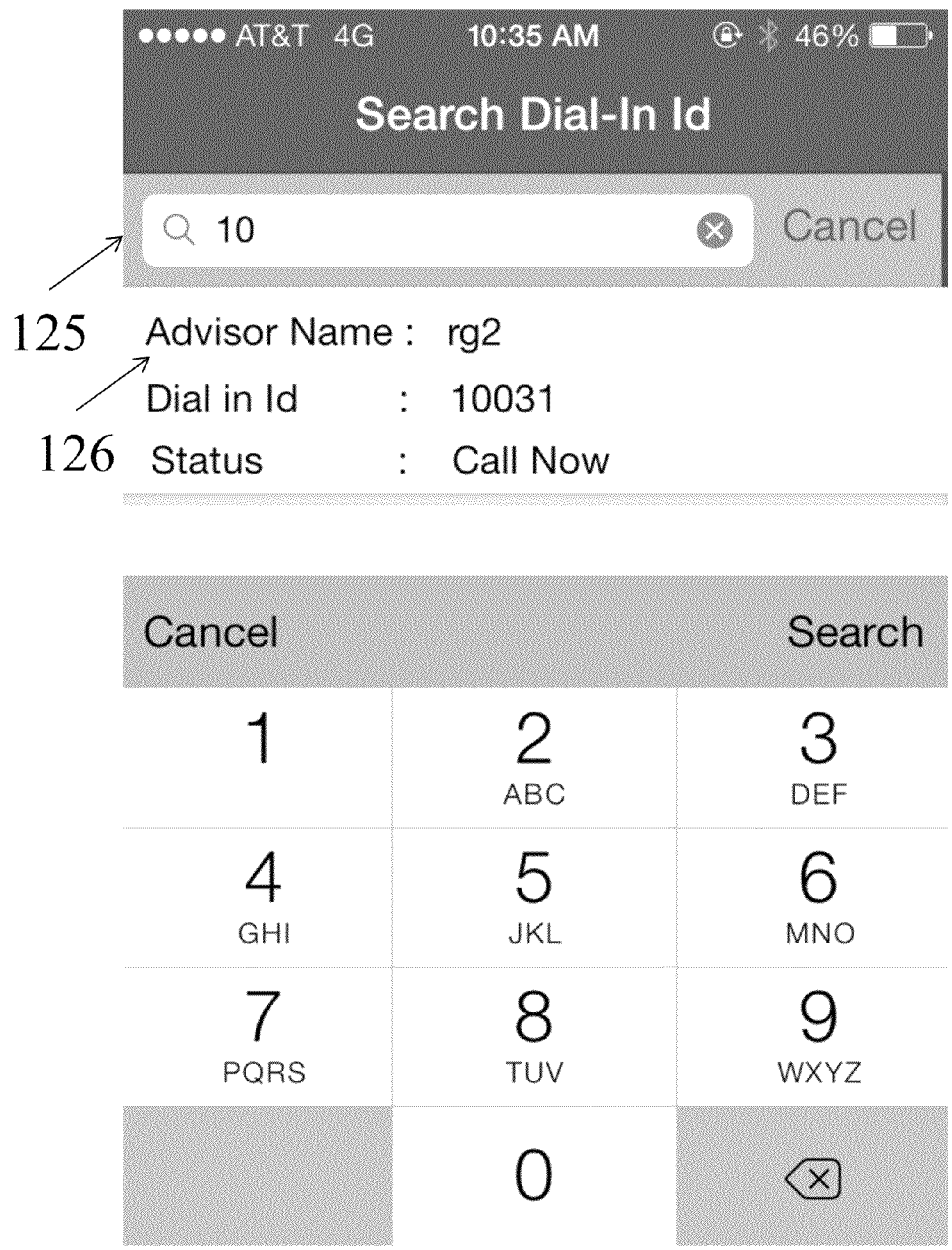
Figure 19:
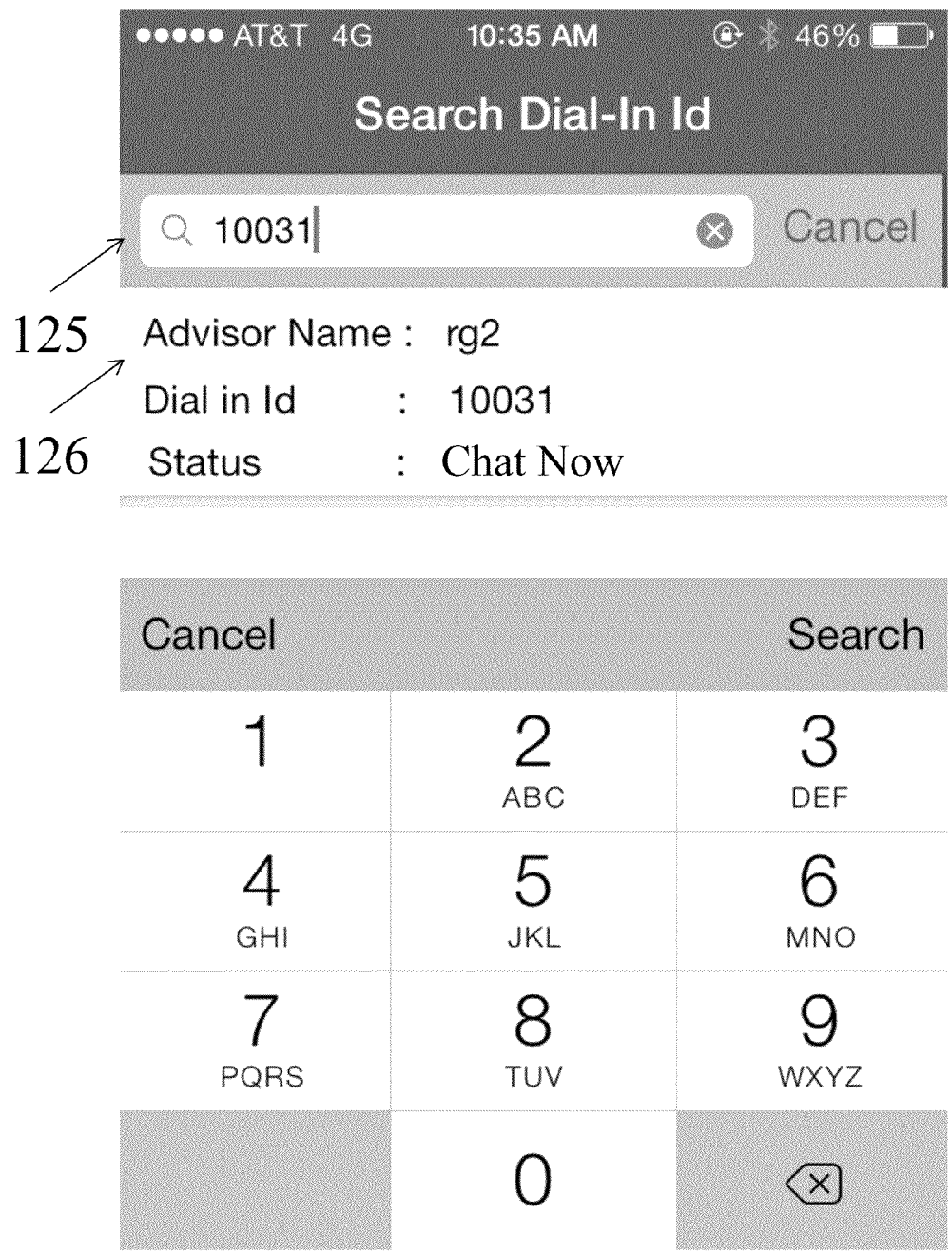
Figure 20:
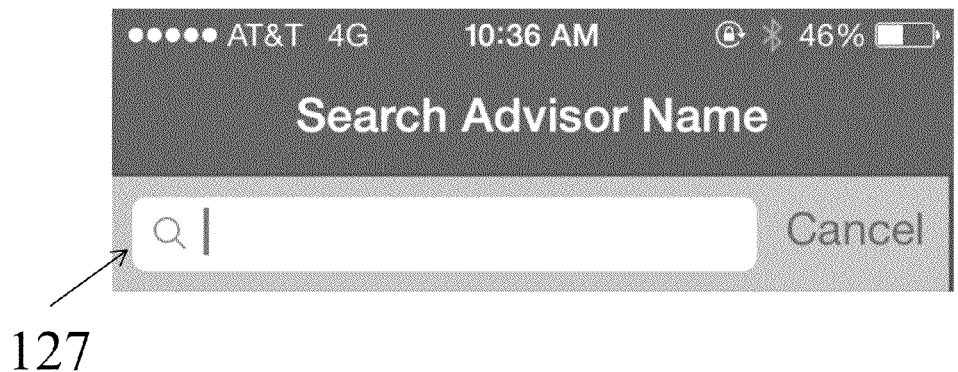
FIG. 20-22 illustrate an advisor search by name.
Figure 20:
Figure 21:
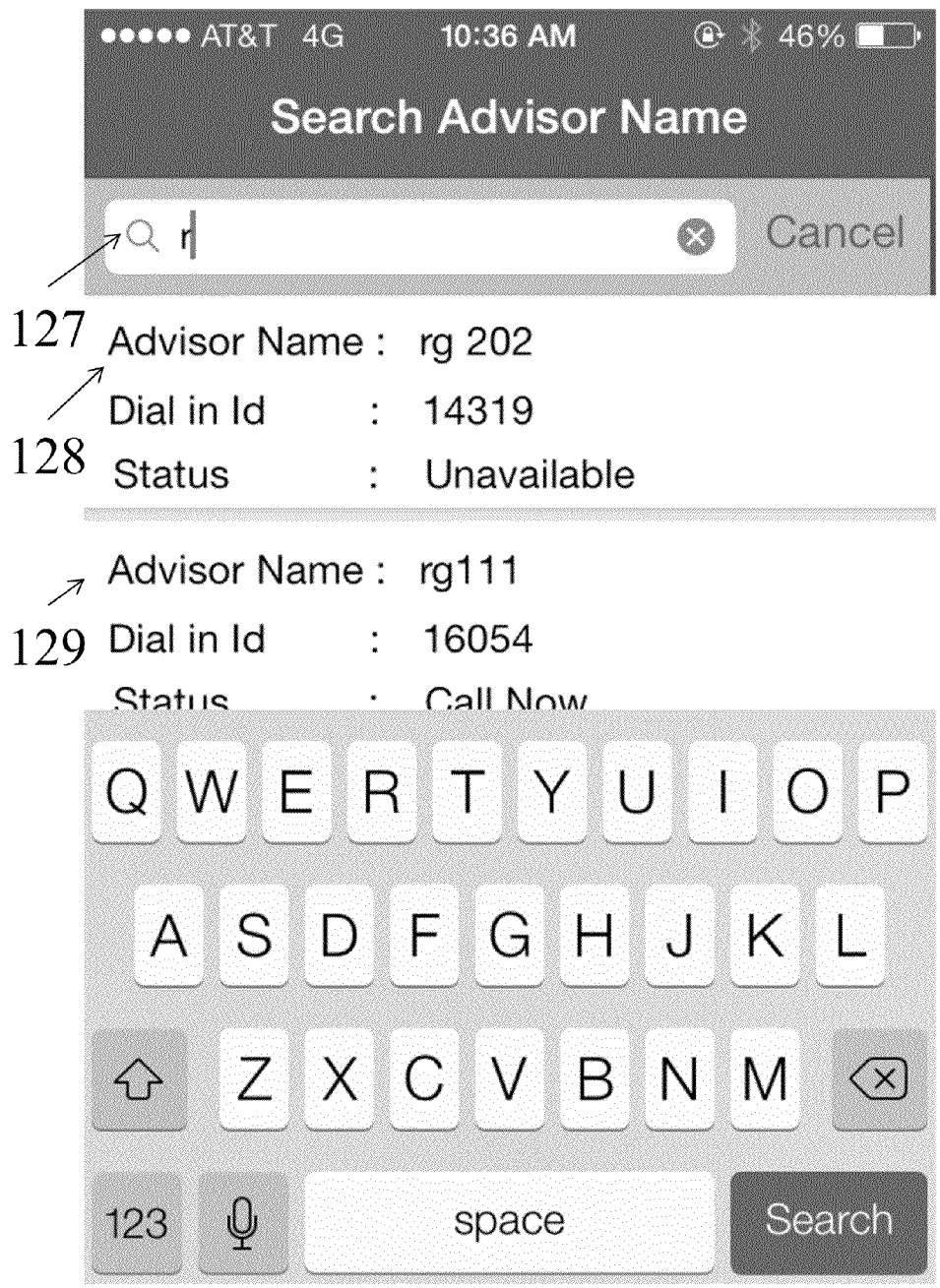
Figure 22:
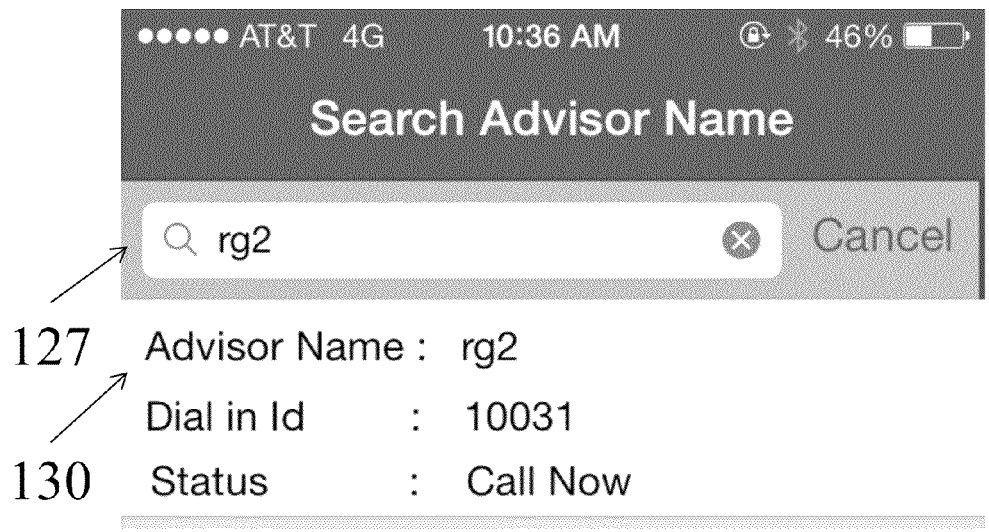
Figure 22:
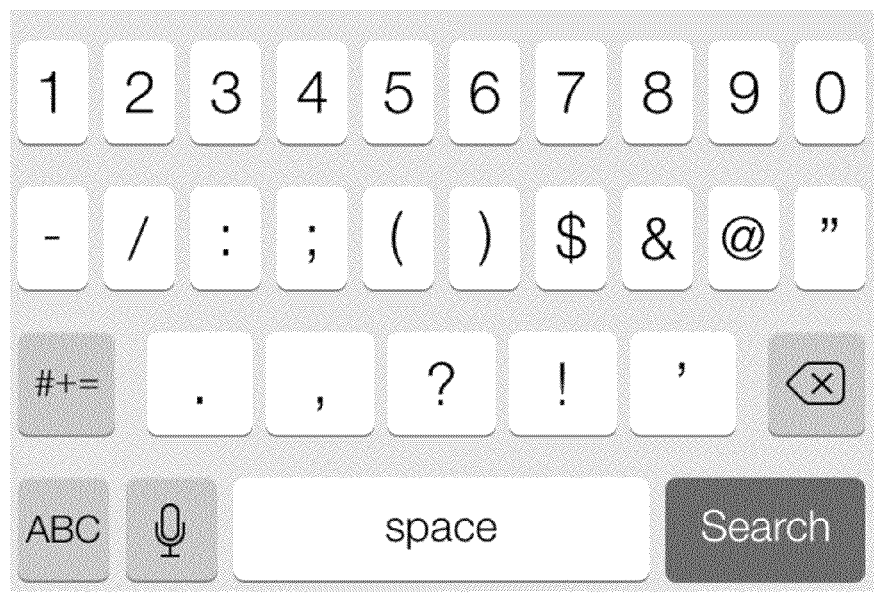

FIGS. 17-19 illustrate a search by dial-in data 161. First the user enters the dial-in ID 166 of an advisor 125. As the User 153 continues to enter in additional digits of the dial-in id 167, one or more advisors are listed 126.

FIG. 20-23 illustrate an advisor search by name 162. First the user enters the letters of an advisor 127. As the User 153 continues to enter in additional letters of the advisor's name, one or more advisors are listed 128-129, until there is only one potential match 130.

Figure 23:
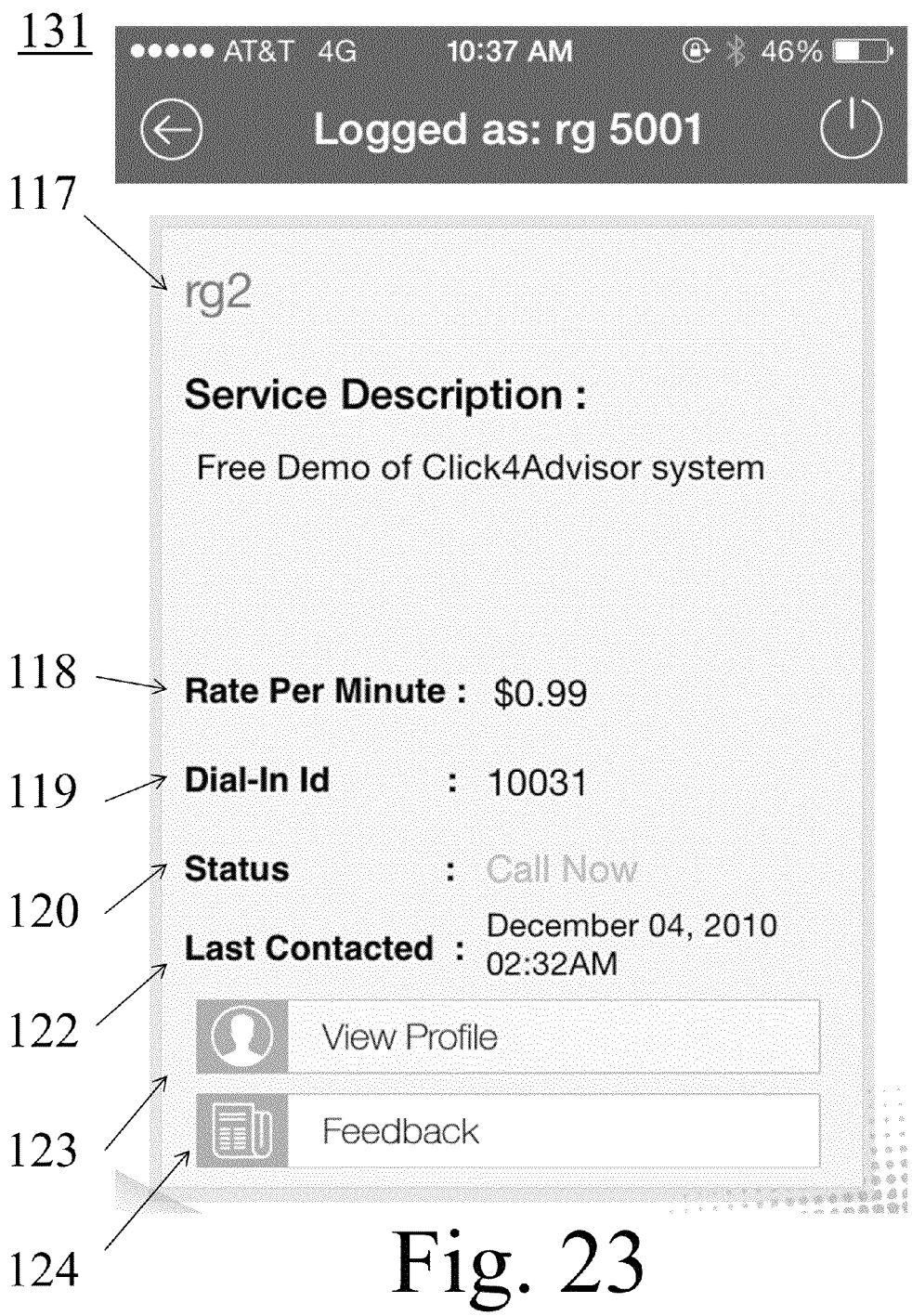
FIG. 23 illustrates advisor search results detail.

FIG. 23 illustrates an advisor search results detail page 131; which shows the advisors detailed information such as the service description 117, rate 118, dial-in ID 119, status 120 is shown on the display screen 121, and last contacts date/time if applicable 122. The User 153 also has the option to click on links to view the advisors profile 123 or feedback 124.

Figure 24:
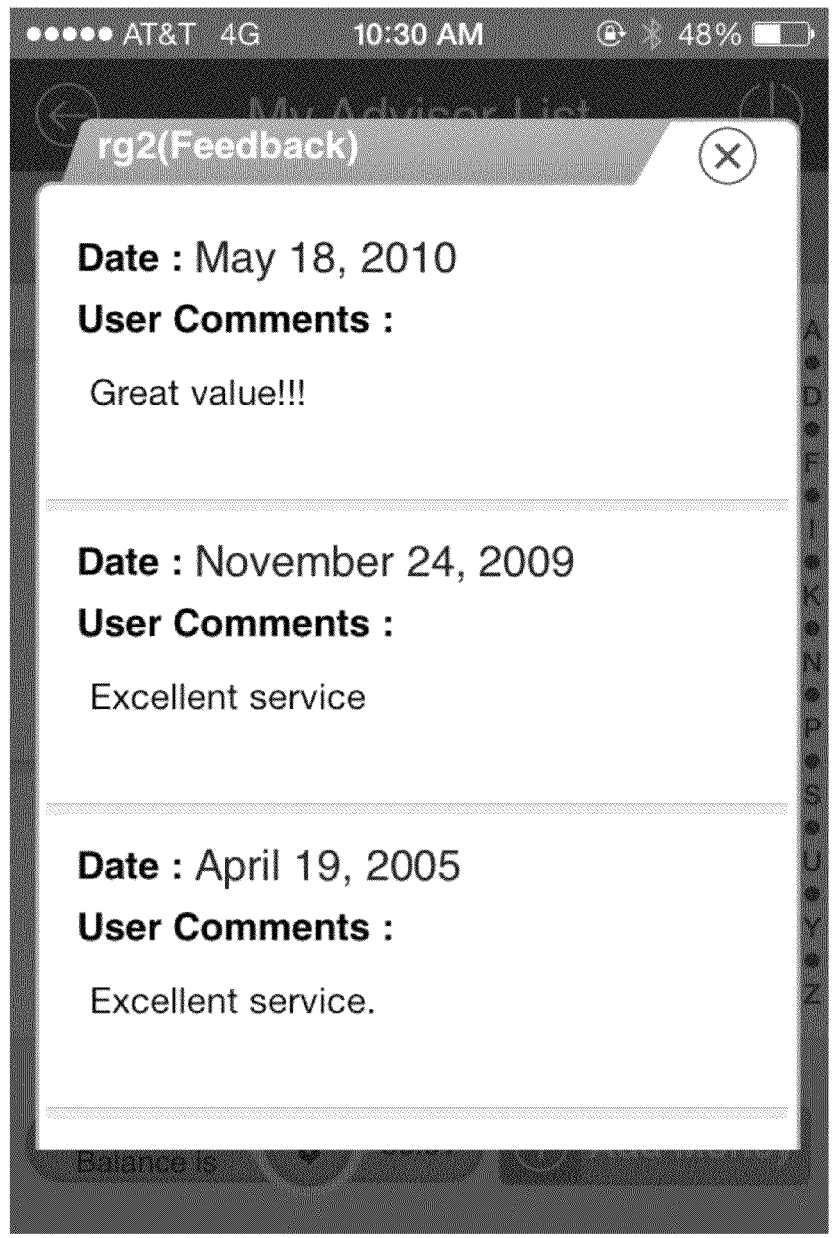
FIG. 24 illustrates advisor feedback.

FIG. 24 illustrates advisor feedback 124 where one user can read the reviews, feedback, and opinion of other users who have used the advisor previously in the system.

Figure 25:
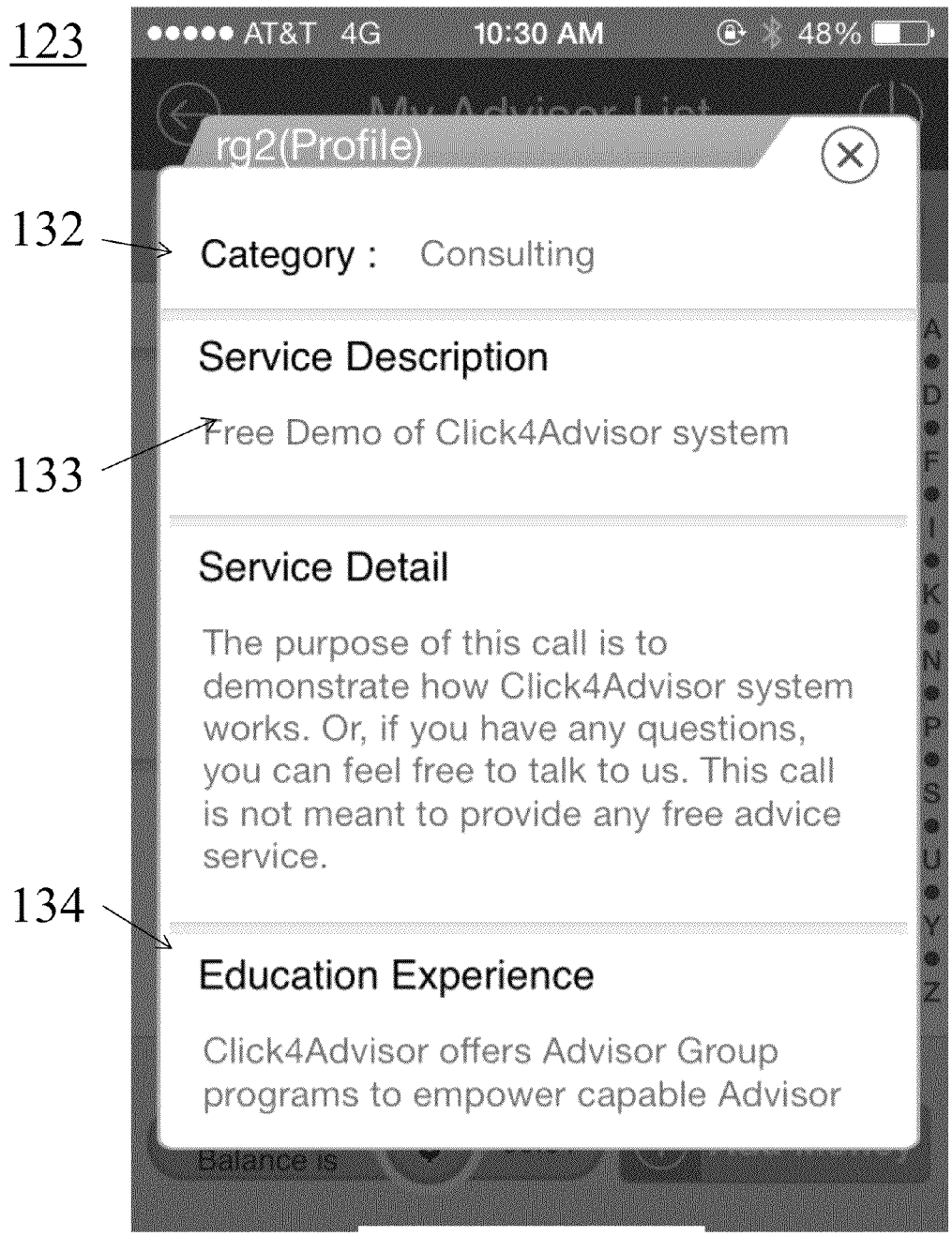
FIG. 25 illustrates an advisor profile.

FIG. 25 illustrates an advisor profile 123 which contains information relating to category 132, service detail 133, and experience 134.

Figure 26:
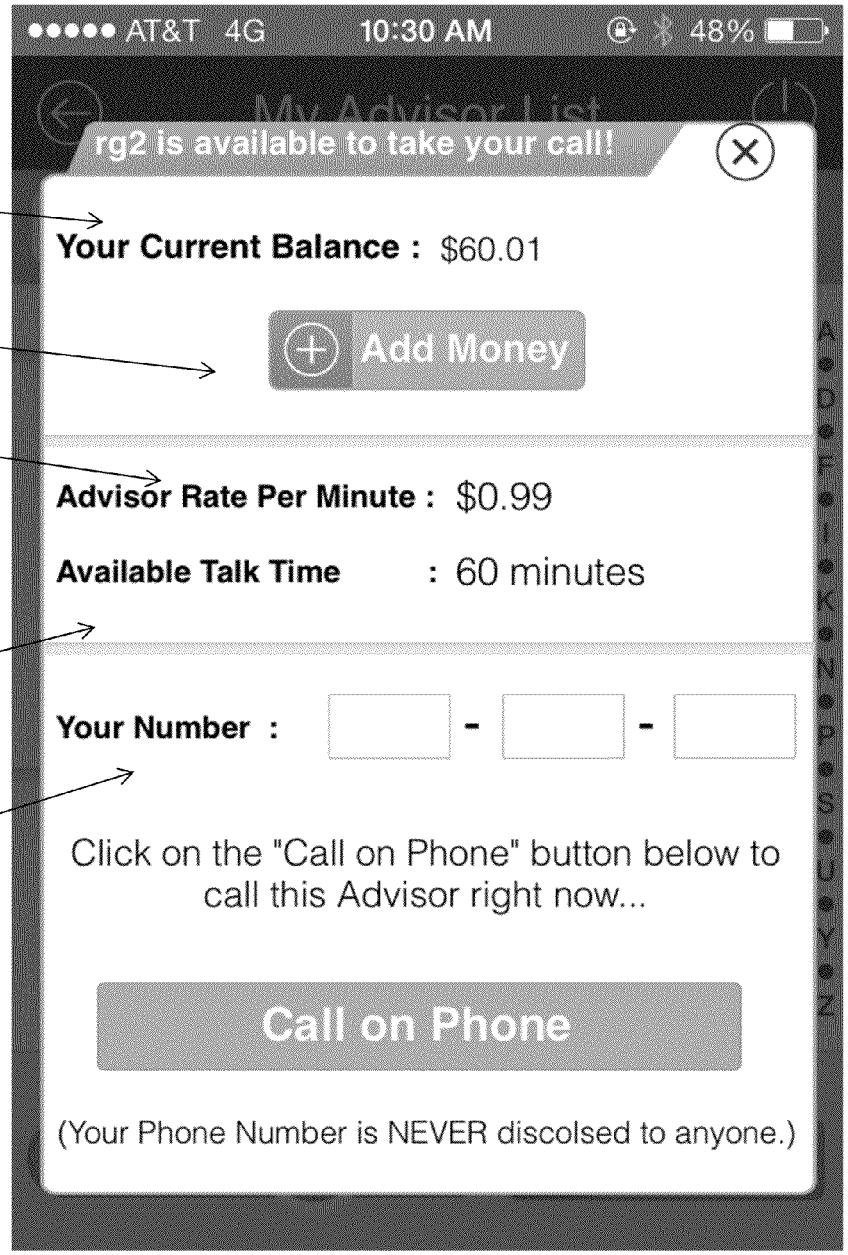
FIG. 26 illustrates a call or chat now screen.
Figure 27:
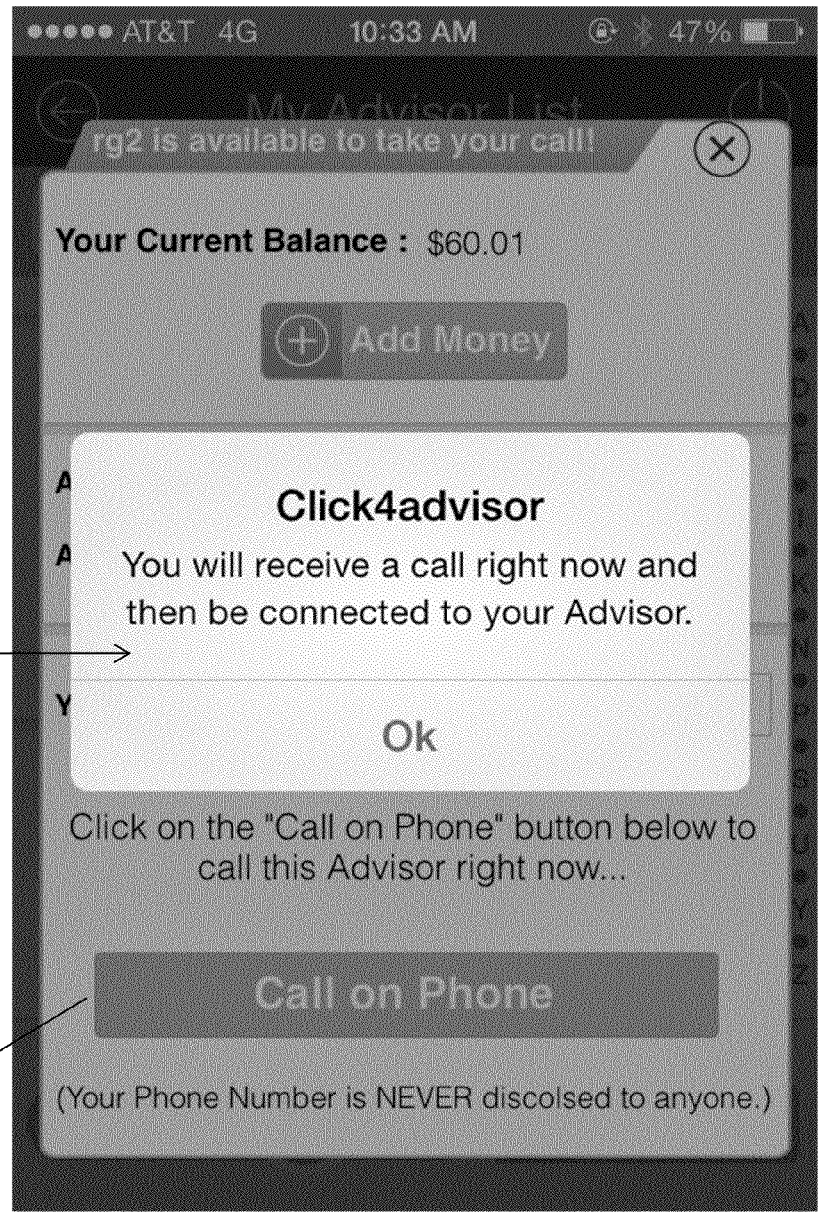
FIG. 27 illustrates a call or chat now result.
Figure 28:
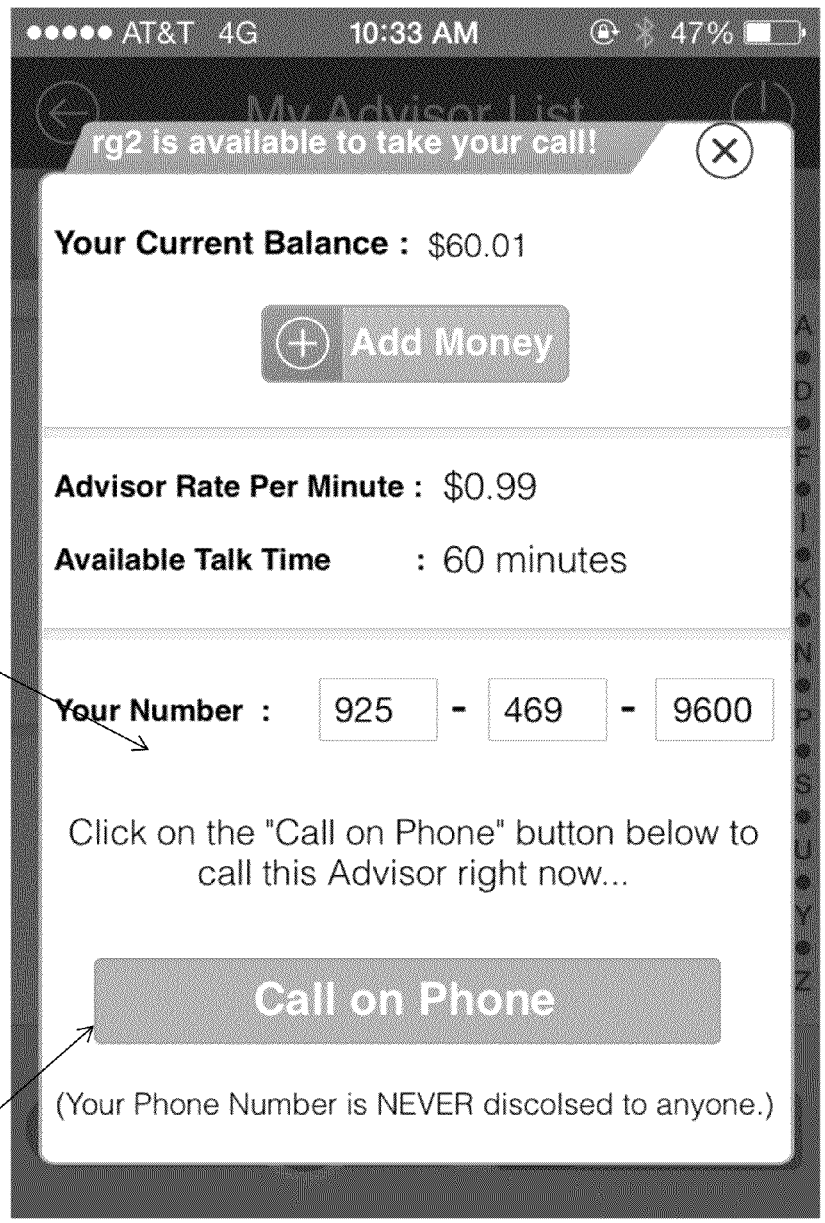
FIG. 28 illustrates a call or chat now with data display.
Figure 29:
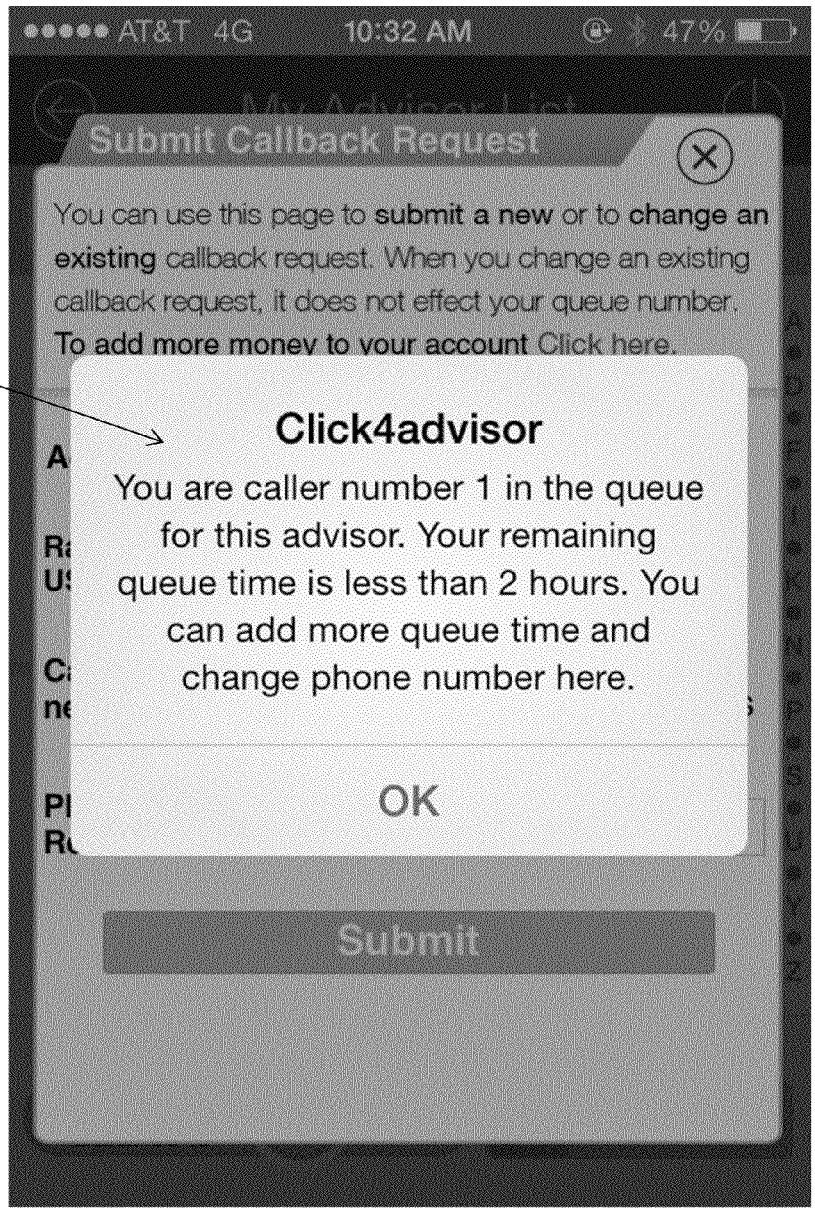
FIGS. 29-32 illustrates a call or chat back request.

FIG. 26 illustrates a call or chat now screen 135 where a user can check their balance 136, add money 137, review the advisor's rate 138, their available talk time 139, and their number 140. When the User is in a "Call Now" screen and the User adds money, it displays the User's new balance and Available Talk Time in real time. If the User 153 selects call or chat on the phone 168 as shown in the call or chat on screen display 141, a pop up confirmation screen appears 169 as shown in illustration 142 for the user to confirm making the call or chat as shown in FIG. 27 and the user then enters their number 140 to initiate the call or chat by selecting the call or chat 170 on phone button/image/link 146. If the user 153 is not immediately able to be connected with the advisor 172, a message 143 will appear advising the user of their position in the queue 171 to speak with the selected advisor as shown in FIG. 29.

Figure 30:
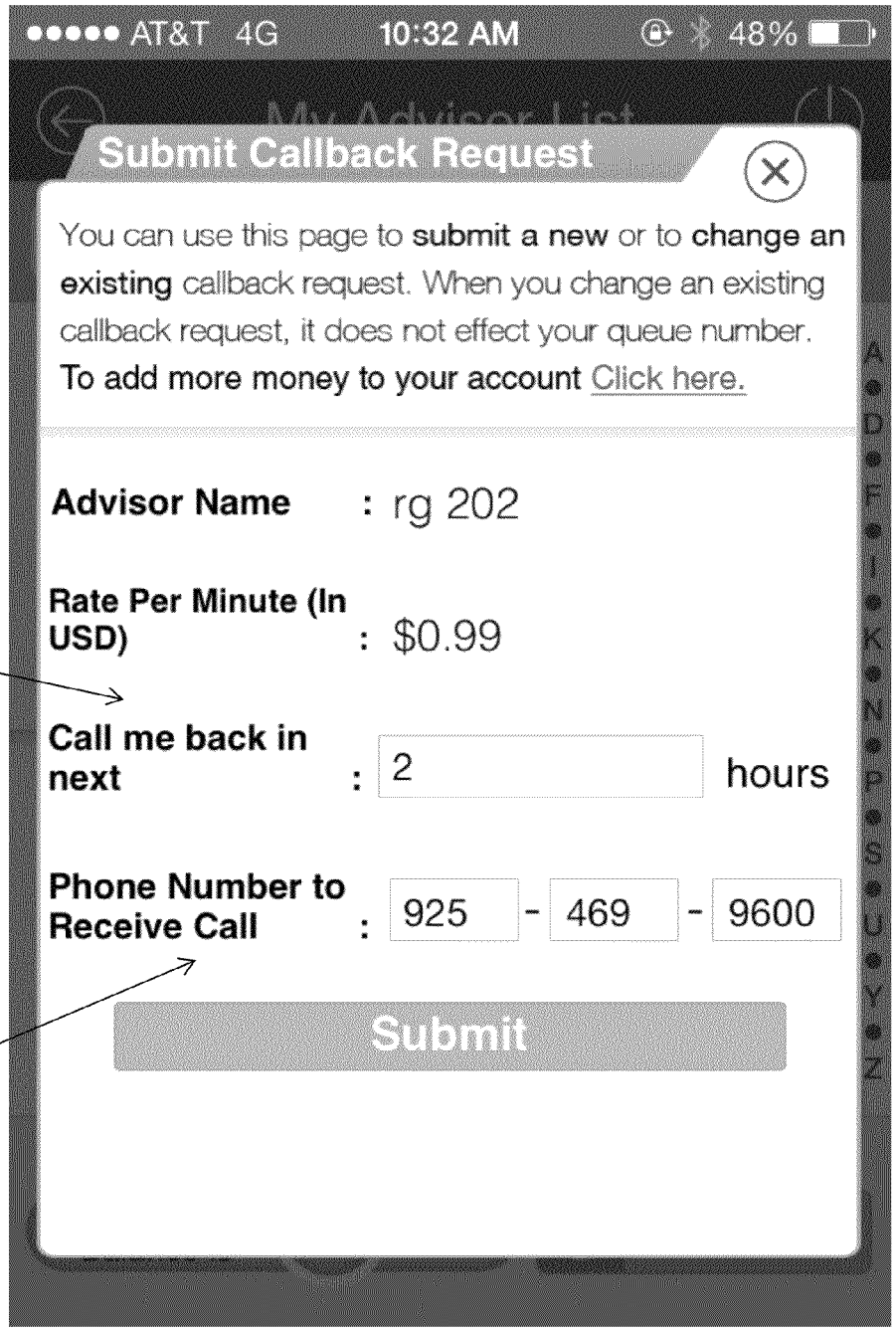
Figure 31:
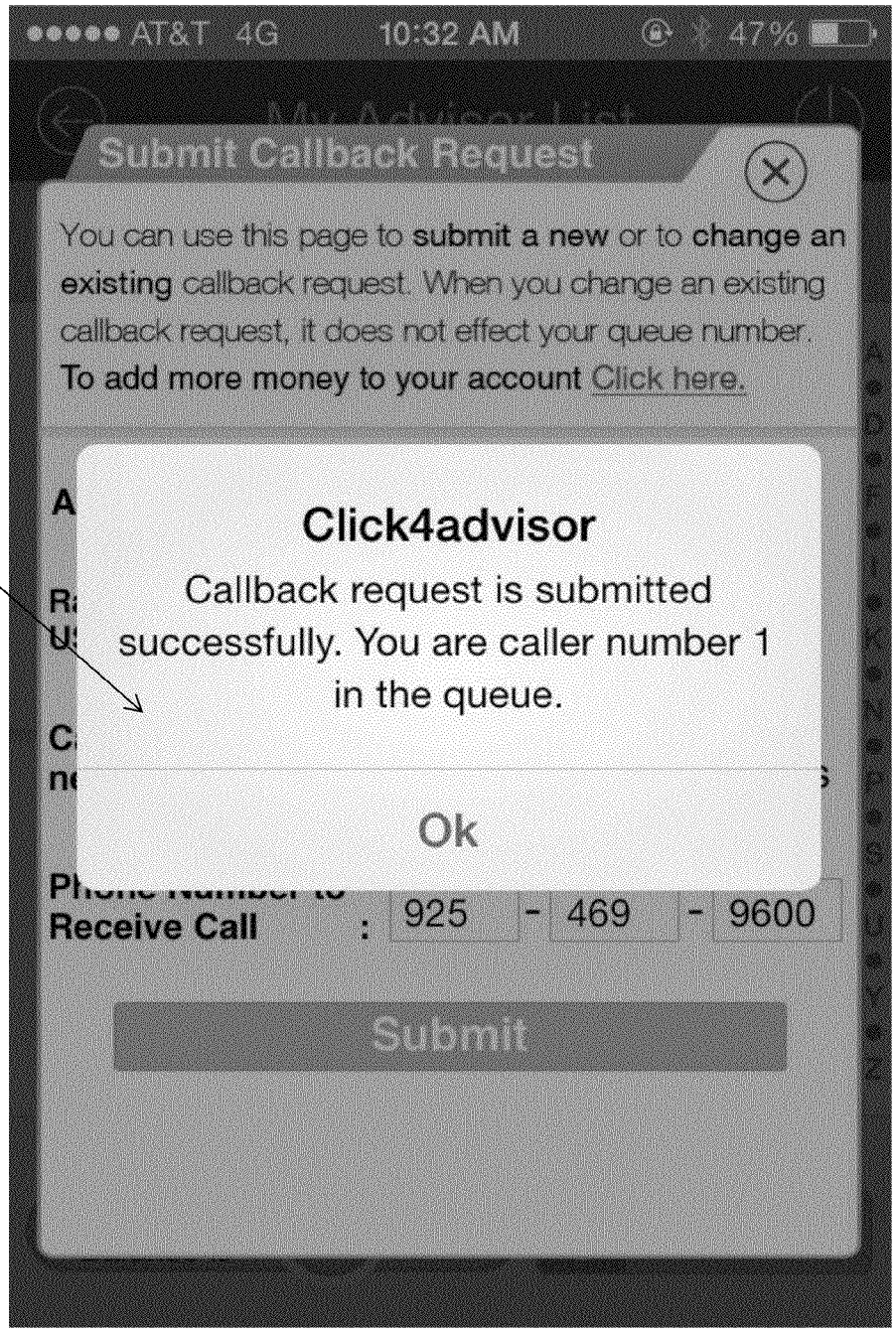
Figure 32:
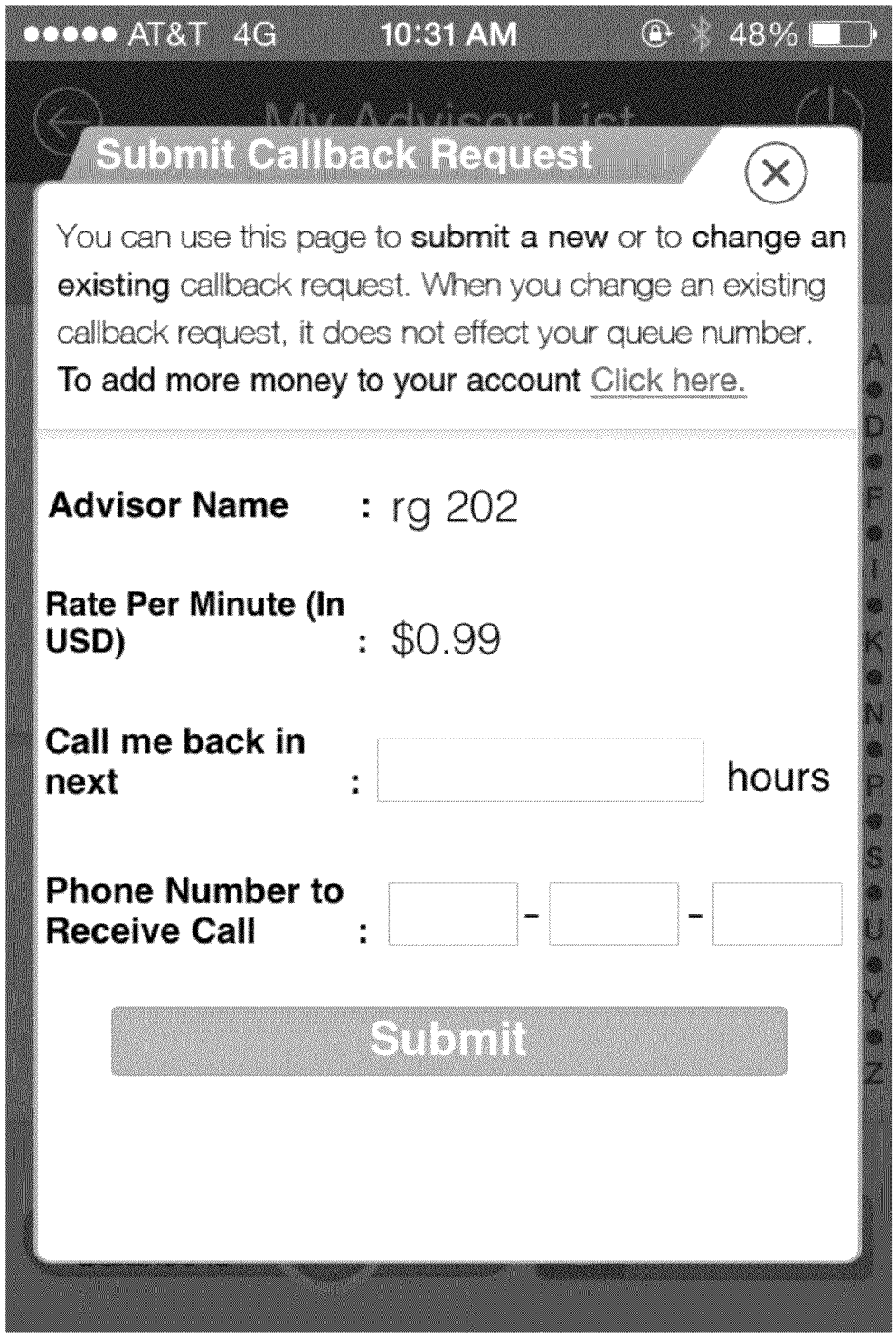

If the User 153 is unable or unwilling to wait, the User 153 can submit a call or chat back time 144 to the advisor with a window of time in which the advisor can call or chat back 173 the User 153 and the phone number 145 at which to reach the User 153 as shown in FIG. 30. When the call or chat back is submitted, a confirmation prompt appears 147 as shown in FIG. 31 and the detailed information of the call or chat back request as shown in FIG. 32 is saved.

Figure 33:
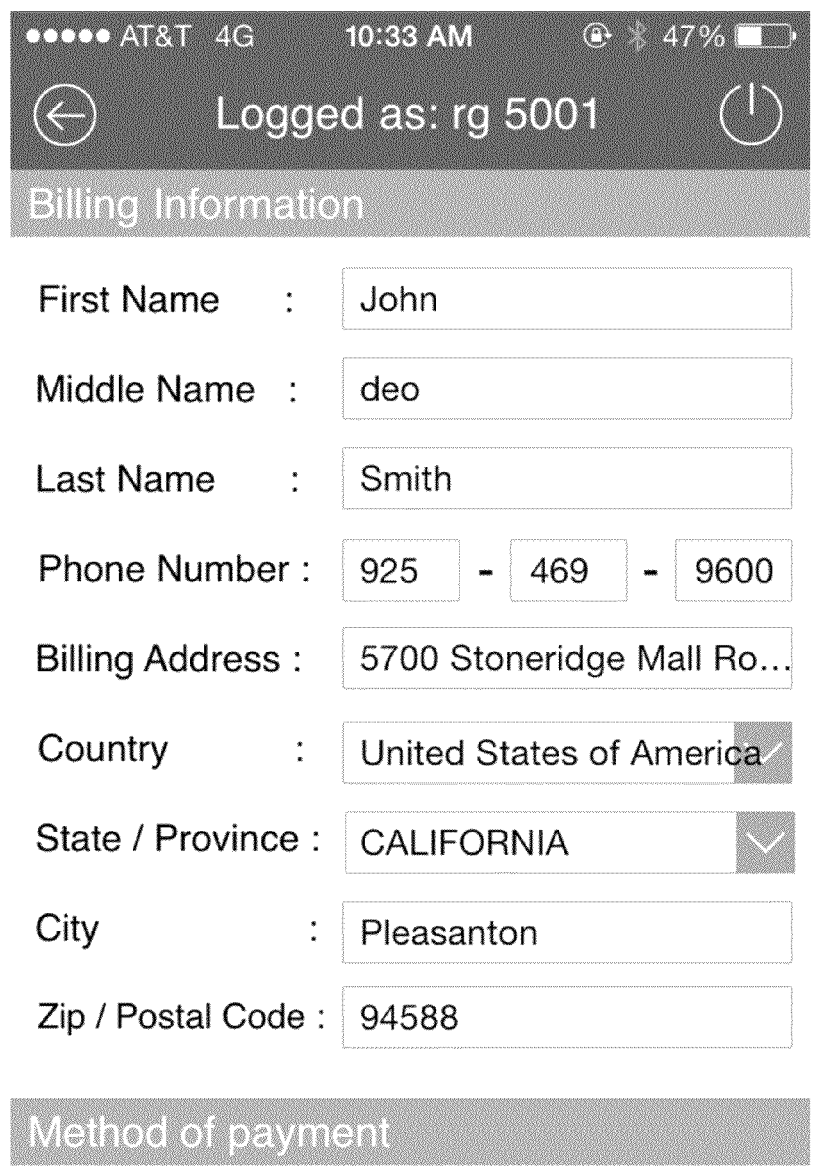
FIGS. 33-34 illustrate the billing information of the present invention.
Figure 34:
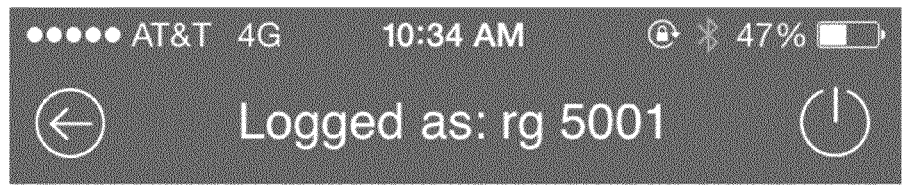

FIGS. 33-34 illustrate the billing information of the present invention. The billing information 149 as shown in FIG. 33 is collected and maintained for each User 153 and Advisor 154 in the system. Payment information 150 is collected and saved in the system as shown in FIG. 34.

In future embodiments of the present invention, the method will be adopted to providing video chat and text chat options by adapting the method to overcome the specific challenges presented by video chat and text chat software and hardware.

The system 1 is set to run on a computing device. A computing device on which the present invention can run would be comprised of a CPU, Hard Disk Drive, Keyboard, Monitor, CPU Main Memory and a portion of main memory where the system resides and executes. Any general-purpose computer with an appropriate amount of storage space is suitable for this purpose. Computer Devices like this are well known in the art and are not pertinent to the invention. The system 1 can also be written in a number of different languages and run on a number of different operating systems and platforms.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A method of connecting, a processor, two parties over a phone call or chat in real time by using non-transitory computer-readable medium capable of execution by a mobile device, the method comprising:
   registering, by the processor, one or more Advisors;
   assigning, by the processor, a dial-in ID number to each registered Advisor;
   creating, by the processor, an Advisor profile;
   creating, by the processor, a searchable database of one or more registered Advisor;
   registering, by the processor, one or more Users;
   creating, by the processor, user accounts for payment transactions;
   enabling the funding, viewing, and transferring of funds in and out of the user accounts for payment transactions by the processor;
   providing, by the processor, prompts to confirm fund transactions and provide confirmations;
   enabling, by the processor, the searching of the registered Advisor database by the users;
   having the User initiate, by the processor, contact with the Advisor;
   and connecting, by the processor, the User and Advisor in a real time, one or one, call or chat.

2. The method of claim 1, further comprising the steps of:
   searching, by the processor, the advisor database by dial-in ID number or name;
   entering, by the processor, an advisor's number using the phone keypad of a mobile device;
   dialing, by the processor, an advisor by number using the phone keypad of their mobile device;
   and entering, by the processor, a first digit of an Advisor's number;
   displaying, by the processor, the matching advisors and their status as the user types characters;
   entering, by the processor, subsequent characters of the Advisor's number;
   displaying, by the processor, all Advisors that match the partial or completed number as it is entered;
   and if no match is found, presenting, by the processor, the User with a blank search input prompt.

3. The method of claim 2, further comprising the step of displaying the advisors detailed information such as the service description, rate, dial-in ID, status is shown on the display screen, and last contacts date/time if applicable once an advisor is successfully found by a number search.

4. The method of claim 1, further comprising the steps of:
   searching, by the processor, the advisor database by dial an advisor's name using the phone keypad of a mobile device;
   dialing, by the processor, an advisor by name using the phone keypad of their mobile device; and entering, by the processor, a first letter of an Advisor's name; displaying, by the processor, the matching advisors and their status as the user types characters; entering, by the processor, subsequent letter of the Advisor's name; and displaying, by the processor, all Advisors that match the partial or completed name as it is entered; and if no match is found, presenting, by the processor, the User with a blank search input prompt.

5. The method of claim 4, further comprising the step of displaying the advisors detailed information such as the service description, rate, dial-in ID, status is shown on the display screen, and last contacts date/time if applicable once an advisor is successfully found by a name search.

6. The method of claim 1, further comprising the steps of: viewing, by the processor, the advisors profile or feedback.

7. The method of claim 1, further comprising the steps of: creating, by the processor, a my advisor list; displaying, by the processor, the my advisor list; enabling, by the processor, scrolling through the list of advisors; providing, by the processor, a quick search on a vertical key pad; and the Advisors profile contains information relating to category, service detail, and experience.

8. The method of claim 1, further comprising the steps of: enabling, by the processor, a user to check their balance, add money, review the advisor's rate, their available talk time, and their dial-in number; adding, by the processor, money to the User's account; and displaying, by the processor, the User's new balance and available talk time in real time.

9. The method of claim 1, further comprising the steps of: entering, by the processor, the Users number to initiate the call or chat by selecting a call or chat on phone button/image/ link; and displaying, by the processor, a pop up confirmation screen for the user to confirm making a call or chat, when a user initiates a call or chat.

10. The method of claim 9, further comprising the step of: displaying a message advising the User of their position in the queue to speak with the selected Advisor if the Advisor is not immediately able to be connected with the User.

11. The method of claim 10, further comprising the step of: submitting, by the processor, a call or chat back time to the Advisor with a window of time in which the Advisor can call or chat back the User and the number at which to reach the user, if the user is unable or unwilling to wait; and displaying, by the processor, a confirmation prompt and the detailed information of the call or chat back request when the call or chat back is submitted.

12. The method of claim 1, further comprising the step of: monitoring, by the processor, how long call or chat connections are maintained between the User and the Advisor; and deducting, by the processor, from Users' account the amounts based upon how long the connections are maintained.

13. The method of claim 1, where a phone call or chat request is between two mobile devices, two computers, or a combination of a mobile device and a computer.

14. A method of connecting two parties in real time, the method comprising:
   providing, by a processor, a communication interface of the server and database wherein said communication interface of the server and database used to initiate a live call or chat with an Advisor via a computer or other electronic mobile device;
   providing, by the processor, real-time communication between two or more parties via the communication interface of the server and database;

having a User click on an icon to initiate a live call or chat conversation with an Advisor;

generating, by the processor, a window with information about said Advisor;

checking, by the processor, to see if the Advisor is available;

connecting, by the processor, said User with said Advisor, if available, via the communication interface of the server and database platform;

initiating, by the processor, a first call or chat to the User, receiving a first phone call or chat by the User at his desired phone number from the communication interface of the server and database platform;

answering the first call or chat by the User from the communication interface of the server and database, initiating a second call or chat to the Advisor in response to the answered first call or chat by the User, from the communication interface of the server and database;

answering the second call or chat from the mobile device platform by the Advisor;

connecting the parties in a call or chat via the communication interface of the server and database;

tracking call or chat information during the duration of the call or chat by the communication interface of the server and database;

alerting, by the processor, said User if said Advisor is not available;

prompting, by the processor, said User to send a call or chat back request to the Advisor if the mobile device platform determines said Advisor is busy or unavailable;

providing input means, via said mobile device platform, for the User to create and send the call or chat back request;

sending, by the processor, a call back request checking for any existing callback requests with that advisor;

displaying, by the processor, the User's queue number and time left for their request once the request is processed successfully;

enabling, by the processor, the User to update the time duration and phone number;

and providing transaction settlement functions between two or more connected parties via the communication interface of the server and database.

15. The method of claim 14, further comprising the step of: Submitting a scheduled request, by the processor, where the user is requesting a specific time and time duration of a chat or call with the Advisor.

16. The method as described in claim 14, further comprising an mobile device platform having said window prompting said User to enter their phone number to make said connection providing means for making a connection and transferring speech and text.

17. The method as described in claim 14, further comprising generating a message for the User in a window via the mobile device platform when said Advisor is not available.

18. The method as described in claim 14, further comprising allowing said Advisor to enter their hours of availability to be visually displayed to Users via the communication interface of the server and database.

19. The method as described in claim 14, further comprising displaying said Advisor's hours of availability via the communication interface of the server and database.

20. The method as described in claim 18, further comprising denying said connection, by the processor, if a User tries to initiate a connection when the Advisor is not available, on another call or chat, or during the hours said Advisor is scheduled to be not available.

21. The method as described in claim 14, further comprising displaying, by the processor, in a window via the mobile device platform that said Advisor is currently busy on another call or chat if said Advisor is currently on another system call or chat.

22. The method as described in claim 20, further comprising denying said connection, by the processor, if a User tries to initiate a connection while said Advisor is busy on another call or chat.

23. The method as described in claim 14, further including displaying a compensation rate, by the processor, in a window via the communication interface of the server and database, based on a period of time, for each Advisor.

24. The method as described in claim 14, further including displaying, by the processor, a link in a window via the mobile device platform to a new window displaying an Advisors' profile and history of previous Users' feedback.

25. The method as described in claim 14, further comprising: setting up, by the processor, an account for the Advisors; and crediting, by the processor, the account for an amount based upon how long the connection is maintained.

26. The method as described in claim 24, further comprising: setting, by the processor, up an account for the Advisors; and crediting, by the processor, the account for an amount based upon how long the telephonic connection is maintained minus a fee.

27. The method as described in claim 14, further comprising: setting up a consumer account in the system for the User, wherein setting up the consumer account includes obtaining credit card information from the consumer; and allowing, by the processor, User to make a deposit to their consumer account.

28. The method as described in claim 14, further comprising: monitoring by the processor, how long the telephonic connection is maintained between said User and said Advisor; and deducting, by the processor, from said User consumer account an amount based upon how long the telephonic connection is maintained.

29. The method as described in claim 14, further comprising a link in a window via the mobile device platform directing Users to make a deposit to their account.

* * * * *